United States Patent
Otani et al.

(10) Patent No.: US 8,050,558 B2
(45) Date of Patent: Nov. 1, 2011

(54) OPTICAL SIGNAL SAMPLING APPARATUS AND METHOD AND OPTICAL SIGNAL MONITOR APPARATUS AND METHOD USING THE SAME

(75) Inventors: Akihito Otani, Atsugi (JP); Takao Tanimoto, Atsugi (JP)

(73) Assignee: Anritsu Corporation, Atsugi-Shi, Kanagawa (JP)

( * ) Notice: Subject to any disclaimer, the term of this patent is extended or adjusted under 35 U.S.C. 154(b) by 511 days.

(21) Appl. No.: 12/308,264

(22) PCT Filed: May 21, 2008

(86) PCT No.: PCT/JP2008/059367
§ 371 (c)(1),
(2), (4) Date: Dec. 10, 2008

(87) PCT Pub. No.: WO2008/146684
PCT Pub. Date: Dec. 4, 2008

(65) Prior Publication Data
US 2010/0232787 A1    Sep. 16, 2010

(30) Foreign Application Priority Data

May 25, 2007    (JP) ................................. 2007-138934

(51) Int. Cl.
H04B 10/08    (2006.01)
(52) U.S. Cl. ........................................... 398/26; 398/25
(58) Field of Classification Search ...................... 398/26
See application file for complete search history.

(56) References Cited

U.S. PATENT DOCUMENTS
6,396,601 B1 *   5/2002   Takara et al. ..................... 398/9
(Continued)

FOREIGN PATENT DOCUMENTS
JP    62-215917 A    9/1987
(Continued)

OTHER PUBLICATIONS

N.Edagawa, M.Suzuki,S.Yamamoto,S.Akiba, Novel wavelength converter using an electroabsorption modulator:conversion experiments up to 40 Gbit/s OFC Feb. 1997 techical digest, pp. 77-78.*

(Continued)

*Primary Examiner* — Ken Vanderpuye
*Assistant Examiner* — Amritbir Sandhu
(74) *Attorney, Agent, or Firm* — Holtz, Holtz, Goodman & Chick, P.C.

(57) ABSTRACT

The optical signal sampling apparatus and the optical signal monitor apparatus are configured of an optical combiner for combining an optical signal to be sampled and a sampling light pulse with each other and an electroabsorption modulator. The electroabsorption modulator has two optical terminals for inputting/outputting the light and a power supply terminal for applying the electric field to the optical path connecting the two optical terminals, and has such a characteristic that the absorption rate of the light propagating through the optical path changes in accordance with the magnitude of the electric field, the light emitted from the optical combiner is received by one of the two optical terminals, and the absorption rate is increased when the sampling light pulse is not incident while the absorption rate is decreased when the sampling light pulse is incident. Further, the apparatuses include a DC power supply for applying a predetermined DC voltage to the power supply terminal and an optical separator for selectively emitting the optical signal component to be sampled, of the optical signals emitted from another of the two optical terminals.

23 Claims, 13 Drawing Sheets

U.S. PATENT DOCUMENTS

| | | | |
|---|---|---|---|
| 6,819,689 B2 | 11/2004 | Yoshida et al. | |
| 7,174,098 B2 | 2/2007 | Yokoyama | |
| 2009/0232513 A1* | 9/2009 | Otani et al. | 398/154 |
| 2010/0150548 A1* | 6/2010 | Otani et al. | 398/25 |

FOREIGN PATENT DOCUMENTS

| | | | |
|---|---|---|---|
| JP | 6-63869 B2 | | 8/1994 |
| JP | 8-204678 A | | 8/1996 |
| JP | 8-233662 A | | 9/1996 |
| JP | 11-72757 A | | 3/1999 |
| JP | 2002-368313 A | | 12/2002 |
| JP | 2003-344168 A | | 12/2003 |
| JP | 2004-222252 A | | 8/2004 |
| JP | 2004-286511 | * | 10/2004 |
| JP | 2004-286511 A | | 10/2004 |
| JP | 2005-345312 A | | 12/2005 |
| JP | 3796357 B2 | | 4/2006 |
| WO | WO 2008/146684 A1 | | 12/2008 |

OTHER PUBLICATIONS

H Zhang, M.Yao, C. Peng, Y.Gao, Opticla waveform measurement with electroabsorption modulator as sampling component, Feb. 2004, Optical engineering vol. 43 No. 2, pp. 441-444.*

T.Mori, A.Otani, T.Otani, All-optical sampling using cross-absorption modulation in Electroabsorption modulator for optical performance monitor, Sep. 2008, Optical communication 2008 ECOC 34th European conference, pp. 1-2.*

International Preliminary Report on Patentability dated Jan. 12, 2010 (in English) in parent International Application No. PCT/JP2008/059367.

N. Edagawa et al; Wavelength Conversion Using an Electroabsorption Modulator; KDD R&D Laboratories; 1997; p. 727.

English language International Search Report dated Jul. 1, 2008, issued in counterpart International Application Serial No. PCT/JP2008/059367.

* cited by examiner

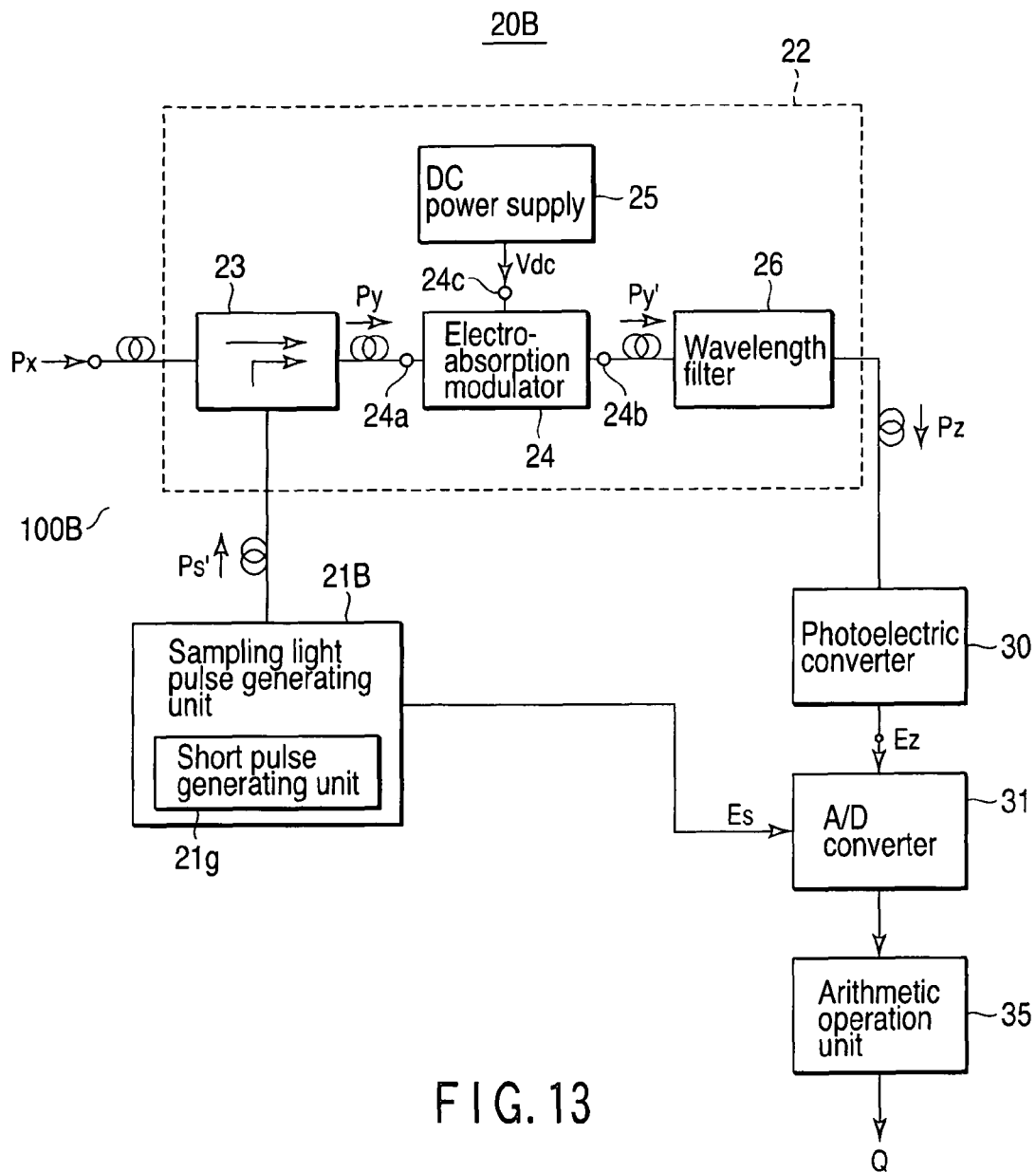
F I G. 13

US 8,050,558 B2

OPTICAL SIGNAL SAMPLING APPARATUS AND METHOD AND OPTICAL SIGNAL MONITOR APPARATUS AND METHOD USING THE SAME

This application is a U.S. National Phase Application under 35 USC 371 of International Application PCT/JP2008/059367 filed May 21, 2008.

TECHNICAL FIELD

The present invention relates to an optical signal sampling apparatus and method and an optical signal monitor apparatus and method using the optical signal sampling apparatus and method, or in particular, an optical signal sampling apparatus and method employing a technique capable of sampling, with a sufficient resolution and a high accuracy, the waveform information of the optical signal modulated by a fast data signal, and an optical signal monitor apparatus and method capable of accurately monitoring the optical signal using the particular optical signal sampling apparatus and method.

BACKGROUND ART

In constructing a network with an optical signal modulated by a data signal, the quality of the optical signal propagated on the network is required to be monitored by an optical signal monitor apparatus.

Generally, the optical signal monitor apparatus acquires the waveform information of the signal on a transmission path and by calculating a value indicating the signal quality from the waveform information, outputs the calculation result thereof. It is very difficult to acquire the waveform information by receiving, directly with a light receiver, the optical signal modulated by the data signal of a very high bit rate of several tens of Gb/s.

In view of this, the conventional optical signal monitor apparatus uses the equivalent time sampling scheme to acquire the waveform information of the fast optical signal.

In the equivalent time sampling scheme, as shown in (a) of FIG. 15, the optical signal P with the same waveform repeated at the period Ta is sampled, as shown in (b) of FIG. 15, with a sampling pulse S having the period Ts=N·Ta+ΔT the slight time ΔT longer than N times (N: integer) the period Ta thereby to acquire, as shown in (c) of FIG. 15, instantaneous amplitude values (instantaneous intensity) different by ΔT at successive positions in the repetitive waveform of the optical signal P.

The waveform P' plotted by the envelope connecting the instantaneous amplitude values thus acquired is a waveform of the optical signal P enlarged by Ts/ΔT times on the time axis, and holds the features of the waveform of the original optical signal P.

With regard to the waveform information acquired by this equivalent time sampling, the probability distribution of the amplitude indicating one of the binary levels and the amplitude of another is determined, and by calculating the standard deviation thereof, the Q value indicating the signal quality can be obtained.

The aforementioned technique of the equivalent time sampling of the optical signal and calculating the Q value indicating the signal quality from the waveform information thus obtained is disclosed in Patent Document 1.

According to Patent Document 1, a bulk-type nonlinear optical member is used normally as an element for the equivalent time sampling of the optical signal.

This nonlinear optical member is generally low in sampling efficiency (the sampling efficiency using the wavelength conversion phenomenon, i.e. the wavelength conversion efficiency is −20 dB or less). A high S/N can be obtained for the waveform information of a strong optical signal, therefore, the problem is that a sufficient S/N cannot be obtained for the waveform information of a weak optical signal.

In view of this, the use is conceived of an electroabsorption modulator remarkably lower in transmission loss than the nonlinear optical member, i.e. substantially high in sampling efficiency as an element for the equivalent time sampling of the optical signal.

The electroabsorption modulator has such a characteristic that the absorption rate of the light passed through the optical path connecting two optical terminals is changed in accordance with the magnitude of the electric field applied in the light path. Only during the time when the optical signal is applied to one of the optical terminals and the electricity sampling pulse signal applied to a power supply terminal to input the sampling pulse signal, the absorption rate of the optical signal is reduced so that the optical signal is emitted from another optical terminal thereby to sample the optical signal.

This technique of sampling the optical signal by applying the electricity sampling pulse signal to the power supply terminal of the electroabsorption modulator is disclosed, for example, in Patent Document 2.

The electricity sampling pulse signal used in Patent Document 2, however, requires the high-frequency impedance matching, and it is very difficult to narrow the pulse width in stable fashion without ringing. This poses the new problem that the waveform information of the optical signal modulated at several tens of Gb/s as described above cannot be acquired with a sufficient resolution and a high accuracy.

Also, in the optical signal quality monitor apparatus using the equivalent time sampling scheme described in Patent Document 1, assume that an eye pattern is generated by superposing a predetermined number of bits of the acquired waveforms and subjected to a quality calculation process on the eye pattern. As long as the sampling period Ts fails to coincide with N·Tc+ΔT strictly, the time axis of the waveform superposed is gradually displaced, thereby posing another problem that the accurate quality calculation is impossible.

Patent Document 1: Japanese Patent No. 3796357
Patent Document 2: Jpn. Pat. Appln. KOKAI Publication No. 2004-222252
Patent Document 3: Jpn. Pat. Appln. KOKAI Publication No. 2002-368313; corresponding to U.S. Pat. No. 6,819,689

DISCLOSURE OF INVENTION

An object of this invention is to solve the problems of the prior art described above and to provide an optical signal sampling apparatus and method having a high sampling efficiency and capable of sampling the waveform information of a fast optical signal accurately with a sufficiently high resolution, and an optical signal monitor apparatus and method capable of obtaining an eye pattern of the optical signal in stable fashion and accurately monitoring the optical signal using the optical signal sampling apparatus and method.

In order to achieve the above-described object, according to a first aspect of the present invention, there is provided an optical signal sampling apparatus (100) comprising:

a sampling light pulse generating unit (21) which generates a sampling light pulse (Ps) having a predetermined period to sample an optical signal to be sampled (Px); and an optical sampling unit (22) which samples the optical signal to be sampled (Px), with the sampling light pulse (Ps) from the sampling light pulse generating unit (21) and emits an optical pulse signal (Pz) obtained by the sampling, wherein the optical sampling unit (22) includes:

an optical combiner (23) which combines the optical signal to be sampled (Px) and the sampling light pulse (Ps) from the sampling light pulse generating unit (21) with each other;

an electroabsorption modulator (24) having two optical terminals (24a, 24b) for inputting/outputting light and a power supply terminal (24c) for applying an electric field to an optical path connecting the two optical terminals (24a, 24b), the electroabsorption modulator (24) having such a characteristic that an absorption rate of the light propagating through the optical path is changed in accordance with the magnitude of the electric field, one terminal (24a) of the two optical terminals (24a, 24b) receiving the light (Py) emitted from the optical combiner (23);

a DC power supply (25) which applies, to the power supply terminal (24c) of the electroabsorption modulator (24), a predetermined DC voltage (Vdc) for sampling the optical signal to be sampled (Px), with the sampling light pulse (Ps) in the electroabsorption modulator (24) by increasing the absorption rate in the absence of the sampling light pulse (Ps) incident to the electroabsorption modulator (24) and decreasing the absorption rate in the presence of the sampling light pulse (Ps) incident to the electroabsorption modulator (24), thereby emitting an optical signal (Py') obtained by the sampling from another terminal (24b) of the two optical terminals (24a, 24b); and an optical separator (26, 26') which selectively emits an optical signal component (Pz) to be sampled, of the optical signal (Py') emitted from the other terminal (24b) of the two optical terminals (24a, 24b) of the electroabsorption modulator (24).

In order to achieve the above-described object, according to a second aspect of the present invention, there is provided the optical signal sampling apparatus according to the first aspect, wherein a wavelength of the sampling light pulse (Ps) is different from a wavelength of the optical signal to be sampled (Px), and the optical separator (26, 26') is configured of a wavelength filter (26) for selectively emitting the optical pulse signal (Pz) having a wavelength component of the optical signal to be sampled (Px), of the optical signal (Py') emitted from the other terminal (24b) of the two optical terminals (24a, 24b) of the electroabsorption modulator (24).

In order to achieve the above-described object, according to a third aspect of the present invention, there is provided the optical signal sampling apparatus according to the first aspect, wherein the optical combiner (23) is configured to combine the optical signal to be sampled (Px) and the sampling light pulse (Ps) with each other by means of polarized waves orthogonal to each other, and the optical separator (26, 26') is configured of a polarization filter (26') for selectively emitting the optical signal (Pz) having a polarization component of the optical signal to be sampled (Px), of the optical signal (Py') emitted from the other terminal (24b) of the two optical terminals (24a, 24b) of the electroabsorption modulator (24).

In order to achieve the above-described object, according to a fourth aspect of the present invention, there is provided the optical signal sampling apparatus according to the first aspect, wherein the sampling light pulse generating unit (21) includes:

a reference signal generator (21a) configured as a synthesizer which generates a stable signal (Ra) having a period Ts corresponding to the period of the sampling light pulse (Ps);

a multiplier (21b) which multiplies the stable signal (Ra) having the period Ts generated by the reference signal generator (21a), by M (M: integer larger than 1), and output as a signal (Rb) multiplied by M;

a light source (21d) which emits continuous light (Pcw);

an optical modulator (21c) which emits an optical pulse (Pa) having a period Ts/M by modulating the continuous light (Pcw) emitted from the light source (21d) with the signal (Rb) multiplied by M output from the multiplier (21b);

an optical gate circuit (21e) which converts the optical pulse (Pa) emitted from the optical modulator (21c) into an optical pulse (Pb) having a period Ts by thinning the optical pulse (Pa) to 1/M; and a dispersion decreasing fiber (21f) which further narrows the pulse width of the optical pulse (Pb) having the period Ts converted by the optical gate circuit (21e) and emits as the sampling light pulse (Ps).

In order to achieve the above-described object, according to a fifth aspect of the present invention, there is provided the optical signal sampling apparatus according to the fourth aspect, further comprising a parameter setting unit (28) which receives the information on a clock period Tc of a data signal modulating the optical signal to be sampled (Px) or a bit rate and a predetermined offset time $\Delta T$ of the data signal, and determines the sampling period Ts of the sampling light pulse (Ps) by an arithmetic operation of $Ts=N \cdot Tc+\Delta T$ (where the value N is determined by the clock period Tc of the data signal and a frequency variable range of a signal capable of being output by the sampling light pulse generating unit (21)), the determined sampling period Ts being set in the sampling light pulse generating unit (21).

In order to achieve the above-described object, according to a sixth aspect of the present invention, there is provided the optical signal sampling apparatus according to the first aspect, wherein the sampling light pulse generating unit (21) is configured of a short pulse generating unit (21g) having a function of generating by self-excited oscillation a short pulse having a frequency different by one integer-th from the frequency of the optical signal to be sampled (Px) and shifting the short-pulse frequency.

In order to achieve the above-described object, according to a seventh aspect of the present invention, there is provided an optical signal monitor apparatus comprising:

an optical signal sampling apparatus (100) having a sampling light pulse generating unit (21) which emits a sampling light pulse (Ps) having a period different by a predetermined offset time from an integer multiple of a clock period (Tc) of a data signal modulating an optical signal to be monitored (Px); and an optical sampling unit (22) which samples the optical signal to be monitored (Px), by the sampling light pulse (Ps) from the sampling light pulse generating unit (21) and emits an optical pulse signal (Pz) obtained by the sampling; and a photoelectric converter (30) which receives the optical pulse signal (Pz) emitted from the optical sampling unit (22) of the optical signal sampling apparatus (100) and converts the optical pulse signal into an electric signal (Ez) thereby to acquire waveform information of the optical signal to be monitored (Px), wherein the optical sampling unit (22) of the optical signal sampling apparatus (100) includes:

an optical combiner (23) which combines the optical signal to be monitored (Px) and the sampling light pulse (Ps) from the sampling light pulse generating unit (21) with each other;

an electroabsorption modulator (24) having two optical terminals (24a, 24b) for inputting/outputting light and a power supply terminal (24c) for applying an electric field to an optical path connecting the two optical terminals (24a, 24b), the electroabsorption modulator (24) having such a characteristic that an absorption rate of the light propagating through the optical path changes in accordance with the magnitude of the electric field, one terminal (24a) of the two optical terminals (24a, 24b) receiving the light (Py) emitted from the optical combiner (23);

a DC power supply (25) which increases the absorption rate in the absence of the sampling light pulse (Ps) incident to the electroabsorption modulator (24) and decreases the absorption rate in the presence of the sampling light pulse (Ps) incident to the electroabsorption modulator (24) so that the electroabsorption modulator (24) samples the optical signal to be sampled (Px), with the sampling light pulse (Ps) and applies a predetermined DC voltage (Vdc) to the power supply terminal (24c) of the electroabsorption modulator (24) to emit an optical signal (Py') obtained by the sampling from another terminal (24b) of the two optical terminals (24a, 24b); and an optical separator (26, 26') which selectively emits an optical signal component (Pz) to be sampled, of the optical signals (Py') emitted from the other terminal (24b) of the two optical terminals (24a, 24b) of the electroabsorption modulator (24).

In order to achieve the above-described object, according to an eighth aspect of the present invention, there is provided the optical signal monitor apparatus according to the seventh aspect, wherein a wavelength of the sampling light pulse (Ps) is different from a wavelength of the optical signal to be monitored (Px), and the optical separator (26, 26') of the optical signal sampling apparatus (100) is configured of a wavelength filter (26) for selectively emitting the optical signal (Pz) having a wavelength component of the optical signal to be monitored (Px), of the optical signals (Py') emitted from the other terminal (24b) of the two optical terminals (24a, 24b) of the electroabsorption modulator (24).

In order to achieve the above-described object, according to a ninth aspect of the present invention, there is provided the optical signal monitor apparatus according to the seventh aspect, wherein the optical combiner (23) of the optical signal sampling apparatus (100) is configured to combine the optical signal to be monitored (Px) and the sampling light pulse (Ps) with each other using polarized waves orthogonal to each other, and the optical separator (26, 26') of the optical signal sampling apparatus (100) is configured of a polarization filter (26') for selectively emitting the optical signal (Pz) having a polarization component of the optical signal to be monitored (Px), of the optical signals (Py') emitted from the other terminal (24b) of the two optical terminals (24a, 24b) of the electroabsorption modulator (24).

In order to achieve the above-described object, according to a tenth aspect of the present invention, there is provided the optical signal monitor apparatus according to the seventh aspect, wherein the sampling light pulse generating unit (21) of the optical signal sampling apparatus (100) includes:

a reference signal generator (21a) configured as a synthesizer which generates a stable signal (Ra) having a period Ts corresponding to a period of the sampling light pulse (Ps);

a multiplier (21b) which multiplies the stable signal (Ra) having the period Ts generated by the reference signal generator (21a) by M (M: integer larger than 1), output as a signal (Rb) multiplied by M;

a light source (21d) which emits continuous light (Pcw);

an optical modulator (21c) which emits an optical pulse (Pa) having a period Ts/M by modulating the continuous light (Pcw) emitted from the light source (21d) with the signal (Rb) multiplied by M output from the multiplier (21b);

an optical gate circuit (21e) which converts the optical pulse (Pa) emitted from the optical modulator (21c) into an optical pulse (Pb) having the period Ts by thinning the optical pulse (Pa) to 1/M; and a dispersion decreasing fiber (21f) which further narrows the pulse width of the optical pulse (Pb) having the period Ts converted by the optical gate circuit (21e) and emits as the sampling light pulse (Ps).

In order to achieve the above-described object, according to an eleventh aspect of the present invention, there is provided the optical signal monitor apparatus according to the tenth aspect, wherein the sampling light pulse generating unit (21) of the optical signal sampling apparatus (100) further comprises a parameter setting unit (28) which receives the information on a clock period Tc of a data signal modulating the optical signal to be monitored (Px) or a bit rate and a predetermined offset time ΔT of the data signal, and determines the sampling period Ts of the sampling light pulse (Ps) by an arithmetic operation of Ts=N·Tc+ΔT (where the value N is determined by the clock period Tc of the data signal and a frequency variable range of a signal capable of being output by the sampling light pulse generating unit (21)), a determined sampling period Ts being set in the sampling light pulse generating unit (21).

In order to achieve the above-described object, according to a twelfth aspect of the present invention, there is provided the optical signal monitor apparatus according to the seventh aspect, wherein the sampling light pulse generating unit (21) of the optical signal sampling apparatus (100) is configured of a short pulse generating unit (21g) having a function of generating by self-excited oscillation a short pulse having a frequency different by one integer-th from the frequency of the optical signal to be monitored (Px) and shifting the short-pulse frequency.

In order to achieve the above-described object, according to a thirteenth aspect of the present invention, there is provided the optical signal monitor apparatus according to the seventh aspect, further comprising:

a fundamental wave component signal output unit (41) which outputs a fundamental wave component signal (U) of a frequency equal to a fundamental wave component of an envelope wave of an output signal (Ez) from the photoelectric converter (30);

a comparator (42) which compares the fundamental wave component signal (U) from the fundamental wave component signal output unit (41) with a predetermined threshold value (Vr); and a data acquisition control unit (44) which starts the acquisition of the waveform information on the output signal (Ez) from the photoelectric converter (30) from the timing when the fundamental wave component signal (U) exceeds the predetermined threshold value (Vr) in a comparing operation of the comparator (42).

In order to achieve the above-described object, according to a fourteenth aspect of the present invention, there is provided the optical signal monitor apparatus according to the thirteenth aspect, further comprising an analog/digital (A/D) converter (31) inserted between the photoelectric converter (30) and the data acquisition control unit (44) for sampling the electric signal (Ez) from the photoelectric converter (30) by a sampling clock (Es) synchronized with the sampling light pulse (Ps) and converting the electric signal (Ez) into a digital value (Dy), which is output as a data signal (Dz) to the data acquisition control unit (44).

In order to achieve the above-described object, according to a fifteenth aspect of the present invention, there is provided the optical signal monitor apparatus according to the fourteenth aspect, wherein the sampling clock (Es) is output in synchronism with the sampling light pulse (Ps) by the sampling light pulse generating unit (21).

In order to achieve the above-described object, according to a sixteenth aspect of the present invention, there is provided the optical signal monitor apparatus according to the thirteenth aspect, wherein the fundamental wave component signal output unit (41), configured as a PLL (phase locked loop), includes:

a narrow-band of bandpass filter (41a) having the central frequency equal to a clock frequency (Fc) of the data signal modulating the optical signal to be monitored (Px) or the central frequency equal to twice the clock frequency (Fc) for extracting a sinusoidal wave of the fundamental wave component signal (U) from the electric signal (Ez) of the photoelectric converter (30);

a voltage-controlled oscillator (41b) which outputs an oscillation output signal having a predetermined oscillation frequency; and a phase comparator (41c) which outputs a control signal (Vc) corresponding to a phase difference between an output signal of the narrow-band of bandpass filter (41a) and the output signal of the voltage-controlled oscillator (41b), wherein the oscillation frequency of the voltage-controlled oscillator (41b) is controlled by the control signal (Vc) output from the phase comparator (41c) and a phase of the oscillation output signal is synchronized with a phase of the output signal of narrow-band of the bandpass filter (41a) thereby to output a synchronized sinusoidal oscillation output signal as the fundamental wave component signal (U).

In order to achieve the above-described object, according to a seventeenth aspect of the present invention, there is provided the optical signal monitor apparatus according to the fourteenth aspect, further comprising a waveform memory (45) having a plurality (H) of different areas where the data signal (Dz) output from the A/D converter (31) are written by the data acquisition control unit (44) based on an output signal of the comparator (42).

In order to achieve the above-described object, according to an eighteenth aspect of the present invention, there is provided the optical signal monitor apparatus according to the fourteenth aspect, wherein the data acquisition control unit (44) repeats, a predetermined number of times (H), an operation in which the data signal (Dz) begins to be written in the waveform memory (45) from the timing when the fundamental wave component signal (U) exceeds the threshold value (Vr) in the comparator (42), and after completely writing a predetermined number (W) of the data signal, the operation stands by until the timing when the fundamental wave component signal (U) exceeds the threshold value (Vr) again, the predetermined number (W) of the data signal (Dz) being written in the plurality (H) of the different areas of the waveform memory (45) in order of address, respectively.

In order to achieve the above-described object, according to a nineteenth aspect of the present invention, there is provided the optical signal monitor apparatus according to the fourteenth aspect, further comprising an arithmetic operation unit (35') which calculates a value indicating the quality of the optical signal to be monitored (Px), based on the data signal (Dz) written in the waveform memory (45).

In order to achieve the above-described object, according to a twentieth aspect of the present invention, there is provided the optical signal monitor apparatus according to the nineteenth aspect, wherein the arithmetic operation unit (35') compares the data signal (Dz) written in the waveform memory (45) with a predetermined threshold value, and by separating the data signals into a sample value associated with the data "1" and a sample value associated with the data "0", determines average values and standard deviation of sample value groups for each of the data thereby to determine a ratio $\mu/\gamma$ between a difference $\mu$ of the average values and a sum $\gamma$ of the standard deviations as a quality value Q.

In order to achieve the above-described object, according to a twenty-first aspect of the present invention, there is provided the optical signal monitor apparatus according to the nineteenth aspect, wherein the arithmetic operation unit (35') capable of obtaining an eye pattern by superposing, in the order of address, the predetermined number (W) of the data signals (Dz) as the waveform data (Dz) of a predetermined number of bits stored in each session in the order of address in the plurality (H) of different areas of the waveform memory (45).

In order to achieve the above-described object, according to a twenty-second aspect of the present invention, there is provided an optical signal sampling method comprising:

a sampling light pulse generating step for generating a sampling light pulse (Ps) of a predetermined period to sample an optical signal to be sampled (Px); and an optical sampling step for sampling the optical signal to be sampled (Px), with the sampling light pulse (Ps) from the sampling light pulse generating unit (21) and emitting an optical pulse signal (Pz) obtained by the sampling, wherein the optical sampling step includes:

a step of preparing an optical combiner (23) for combining the optical signal to be sampled (Px) and the sampling light pulse (Ps) with each other;

a step of preparing an electroabsorption modulator (24) having two optical terminals (24a, 24b) for inputting/outputting light and a power supply terminal (24c) for applying an electric field to an optical path connecting the two optical terminals (24a, 24b), the modulator having such a characteristic that an absorption rate of the light propagating through the optical path is changed in accordance with the magnitude of the electric field, one terminal (24a) of the two optical terminals (24a, 24b) receiving the light (Py) emitted from the optical combiner (23);

a step of preparing a DC power supply (25) for applying, to the power supply terminal (24c) of the electroabsorption modulator (24), a predetermined DC voltage (Vdc) for sampling the optical signal to be sampled (Px), with the sampling light pulse (Ps) in the electroabsorption modulator (24) by increasing the absorption rate in the absence of the sampling light pulse (Ps) incident to the electroabsorption modulator (24) and decreasing the absorption rate in the presence of the sampling light pulse (Ps) incident to the electroabsorption modulator (24), the optical signal (Py') obtained by the sampling being emitted from another terminal (24b) of the two optical terminals (24a, 24b); and a step of preparing an optical separator (26, 26') for selectively emitting the optical signal component (Pz) to be sampled, of the optical signal (Py') emitted from the other terminal (24b) of the two optical terminals (24a, 24b) of the electroabsorption modulator (24).

In order to achieve the above-described object, according to a twenty-third aspect of the present invention, there is provided an optical signal monitor method comprising:

a sampling light pulse generating step for emitting a sampling light pulse (Ps) having a period different by a predetermined offset time from an integer multiple of a clock period (Tc) of the data signal modulating the optical signal to be monitored (Px);

an optical sampling step for sampling the optical signal to be monitored (Px), by a sampling light pulse (Ps) and emitting an optical pulse signal (Pz) obtained by the sampling; and a photoelectric conversion step for acquiring the waveform information of the optical signal to be monitored (Px), by receiving the optical pulse signal (Pz) emitted from the optical sampling unit (22) of the optical signal sampling apparatus (100) and converting the optical pulse signal (Pz) into an electric signal (Ez), wherein the optical sampling step includes:

a step of preparing an optical combiner (23) for combining the optical signal to be monitored (Px) and the sampling light pulse (Ps) with each other;

a step of preparing an electroabsorption modulator (24) having two optical terminals (24a, 24b) for inputting and outputting light and a power supply terminal (24c) for applying an electric field to an optical path connecting the two optical terminals (24a, 24b), the electroabsorption modulator (24) having such a characteristic that an absorption rate of the light propagating through the optical path changes in accordance with the magnitude of the electric field, one terminal (24a) of the two optical terminals (24a, 24b) receiving the light (Py) emitted from the optical combiner (23);

a step of preparing a DC power supply (25) for applying, to the power supply terminal (24c) of the electroabsorption modulator (24), a predetermined DC voltage (Vdc) for sampling the optical signal to be sampled (Px), with the sampling light pulse (Ps) in the electroabsorption modulator (24) by increasing the absorption rate in the absence of the sampling light pulse (Ps) incident to the electroabsorption modulator (24) and decreasing the absorption rate in the presence of the sampling light pulse (Ps) incident to the electroabsorption modulator (24), thereby emitting an optical signal (Py') obtained by the sampling from another terminal (24b) of the two optical terminals (24a, 24b); and a step of preparing an optical separator (26, 26') for selectively emitting an optical signal component (Py') to be sampled, of the optical signal (Py') emitted from the other of the two optical terminals (24b) of the electroabsorption modulator (24).

As described above, with the optical sampling apparatus and the optical sampling method according to the invention, an electroabsorption modulator is used as a sampling element, and an optical signal to be sampled and a sampling light pulse are combined and applied to one of the optical terminals of the modulator, while the power supply terminal is supplied with a predetermined DC voltage indicating a high absorption rate in the absence of an incident sampling light pulse and a low absorption rate in the presence of an incident sampling light pulse, while the component of the optical signal is selectively emitted from the light emitted from the other optical terminal in the presence of an incident sampling light pulse.

With the optical sampling apparatus and the optical sampling method according to the invention, therefore, a light pulse having a narrow width can be used for sampling, and the loss of the optical signal can be reduced. Thus, the sampling efficiency is improved substantially, and the waveform information for even a weak optical signal can be obtained accurately.

With the optical signal monitor apparatus and the optical signal monitor method according to the invention, on the other hand, the fundamental wave component signal is extracted from the signal obtained by sampling the optical signal, and the waveform information begins to be acquired from the timing when the fundamental wave component signal exceeds a threshold value. Therefore, the waveform information acquisition start timing can be synchronized with the data signal modulated on the actually incident optical signal, and by superposing plural sets of waveform information obtained at the start timing, an eye pattern can be obtained in stable fashion.

BRIEF DESCRIPTION OF DRAWINGS

FIG. 13 is a block diagram shown for explaining the configuration of the optical signal sampling apparatus and method and the optical signal monitor apparatus and method using the same according to a fourth embodiment of the invention.

BEST MODE FOR CARRYING OUT THE INVENTION

Several typical embodiments of the optical signal sampling apparatus and an optical signal monitor apparatus using the same according to the invention are explained below with reference to the drawings.

First Embodiment

Figure 1:
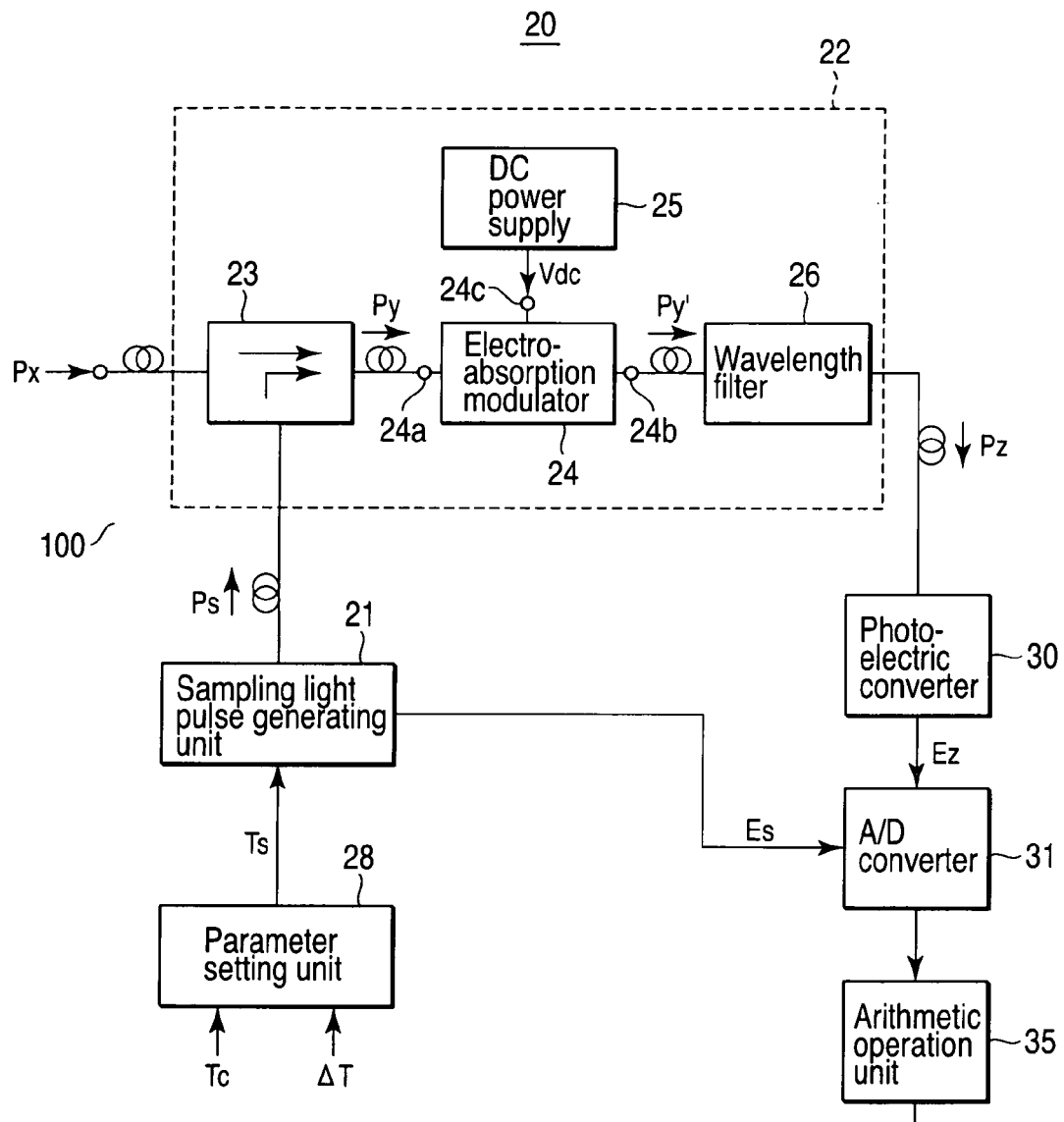
FIG. 1 is a block diagram shown for explaining the configuration of the optical signal sampling apparatus and method and the optical signal monitor apparatus and method using the same according to the first embodiment of the invention.

FIG. 1 is a block diagram shown for explaining the configuration of the optical signal sampling apparatus 100 and the optical signal monitor apparatus 20 using the same according to the first embodiment of the invention.

An optical signal sampling apparatus 100 according to the invention basically includes: a sampling light pulse generating unit 21 which generates a sampling light pulse Ps of a predetermined period to sample an optical signal to be sampled Px; and an optical sampling unit 22 which samples the optical signal to be sampled Px, with the sampling light pulse Ps from the sampling light pulse generating unit 21 and emits an optical pulse signal Pz obtained by the sampling, wherein the optical sampling unit 22 includes: an optical combiner 23 which combines the optical signal to be sampled Px and the sampling light pulse Ps from the sampling light pulse generating unit 21 with each other; an electroabsorption modulator 24 having two optical terminals 24a, 24b for inputting/outputting light and a power supply terminal 24c for applying an electric field to an optical path connecting the two optical terminals 24a, 24b, the modulator having such a characteristic that an absorption rate of the light propagating through the optical path is changed in accordance with the magnitude of the electric field, one terminal 24a of the two optical terminals 24a, 24b receiving the light Py emitted from the optical combiner 23; a DC power supply 25 which applies, to the power supply terminal 24c of the electroabsorption modulator 24, a predetermined DC voltage Vdc for sampling the optical signal to be sampled Px, with the sampling light pulse Ps in the electroabsorption modulator 24 by increasing the absorption rate in the absence of the sampling light pulse Ps incident to the electroabsorption modulator 24 and decreasing the absorption rate in the presence of the sampling light pulse Ps incident to the electroabsorption modulator 24, an optical signal Py' obtained by the sampling being emitted from another terminal 24b of the two optical terminals 24a, 24b; and an optical separator 26, 26' which selectively emits an optical signal component Pz to be sampled, of the optical signal Py' emitted from the other terminal 24b of the two optical terminals 24a, 24b of the electroabsorption modulator 24.

An optical signal sampling method according to the invention basically includes: a sampling light pulse generating step for generating a sampling light pulse Ps of a predetermined period to sample an optical signal to be sampled Px; and an optical sampling step for sampling the optical signal to be sampled Px, with the sampling light pulse Ps from the sampling light pulse generating unit 21 and emitting an optical pulse signal Pz obtained by the sampling, wherein the optical sampling step includes: a step of preparing an optical combiner 23 for combining the optical signal to be sampled Px and the sampling light pulse Ps with each other; a step of preparing an electroabsorption modulator 24 having two optical terminals 24a, 24b for inputting/outputting light and a power supply terminal 24c for applying an electric field to an optical path connecting the two optical terminals 24a, 24b, the modulator having such a characteristic that an absorption rate of the light propagating through the optical path is changed in accordance with the magnitude of the electric field, one terminal 24a of the two optical terminals 24a, 24b receiving the light Py emitted from the optical combiner 23; a step of preparing a DC power supply 25 for applying, to the power supply terminal 24c of the electroabsorption modulator 24, a predetermined DC voltage Vdc for sampling the optical signal to be sampled Px, with the sampling light pulse Ps in the electroabsorption modulator 24 by increasing the absorption rate in the absence of the sampling light pulse Ps incident to the electroabsorption modulator 24 and decreasing the absorption rate in the presence of the sampling light pulse Ps incident to the electroabsorption modulator 24, thereby emitting an optical signal Py' obtained by the sampling from another terminal 24b of the two optical terminals 24b; and a step of preparing an optical separator 26, 26' for selectively emitting an optical signal component Pz to be sampled, of the optical signal Py' emitted from the other terminal 24b of the two optical terminals 24a, 24b of the electroabsorption modulator 24.

An optical signal monitor apparatus 20 according to the invention basically includes: an optical signal sampling apparatus 100 having a sampling light pulse generating unit 21 which emits a sampling light pulse Ps having a period different by a predetermined offset time from an integer multiple of a clock period Tc of a data signal modulating an optical signal to be monitored Px; and an optical sampling unit 22 which samples the optical signal to be monitored Px, by the sampling light pulse Ps from the sampling light pulse generating unit 21 and emits an optical pulse signal Pz obtained by the sampling; and a photoelectric converter 30 which receives the optical pulse signal Pz emitted from the optical sampling unit 22 of the optical signal sampling apparatus 100 and converts the optical pulse signal into an electric signal Ez thereby to acquire waveform information of the optical signal to be monitored Px, wherein the optical sampling unit 22 of the optical signal sampling apparatus 100 includes: an optical combiner 23 which combines the optical signal to be monitored Px and the sampling light pulse Ps from the sampling light pulse generating unit 21 with each other; an electroabsorption modulator 24 having two optical terminals 24a, 24b for inputting/outputting light and a power supply terminal 24c for applying an electric field to an optical path connecting the two optical terminals 24a, 24b, the electroabsorption modulator 24 having such a characteristic that an absorption rate of the light propagating through the optical path changes in accordance with the magnitude of the electric field, one terminal 24a of the two optical terminals 24a, 24b receiving the light Py emitted from the optical combiner 23; a DC power supply 25 which increases the absorption rate in the absence of the sampling light pulse Ps incident to the electroabsorption modulator 24 and decreases the absorption rate in the presence of the sampling light pulse Ps incident to the electroabsorption modulator 24 so that the electroabsorption modulator 24 samples the optical signal to be sampled Px, with the sampling light pulse Ps and applies a predetermined DC voltage Vdc to the power supply terminal 24c of the electroabsorption modulator 24 to emit the optical signal Py' obtained by the sampling from another terminal 24b of the two optical terminals 24a, 24b; and an optical separator 26, 26' which selectively emits the optical signal component Pz to be sampled, of an optical signal Py' emitted from the other terminal 24b of the two optical terminals 24a, 24b of the electroabsorption modulator 24.

An optical signal monitor method of the invention basically includes: a sampling light pulse generating step for emitting a sampling light pulse Ps having a period different by a predetermined offset time from an integer multiple of a clock period Tc of a data signal modulating an optical signal to be monitored Px; an optical sampling step for sampling the optical signal to be monitored Px, by the sampling light pulse Ps and emitting an optical pulse signal Pz obtained by the sampling; and a photoelectric conversion step for acquiring waveform information of the optical signal to be monitored Px, by receiving the optical pulse signal Pz emitted from the optical sampling unit 22 of the optical signal sampling apparatus 100 and converting the optical pulse signal Pz into an electric signal Ez, wherein the optical sampling step includes: a step of preparing an optical combiner 23 for combining the optical signal to be monitored Px and the sampling light pulse Ps with each other; a step of preparing an electroabsorption modulator 24 having two optical terminals 24a, 24b for inputting/outputting light and a power supply terminal 24c for applying an electric field to an optical path connecting the two optical terminals 24a, 24b, the electroabsorption modulator 24 having such a characteristic that an absorption rate of the light propagating through the optical path changes in accordance with the magnitude of the electric field, one terminal 24a of the two optical terminals 24a, 24b receiving the light Py emitted from the optical combiner 23; a step of preparing a DC power supply 25 for applying, to the power supply terminal 24c of the electroabsorption modulator 24, a predetermined DC voltage Vdc for sampling the optical signal to be sampled Px, with the sampling light pulse Ps in the electroabsorption modulator 24 by increasing the absorption rate in the absence of the sampling light pulse Ps incident to the electroabsorption modulator 24 and decreasing the absorption rate in the presence of the sampling light pulse Ps incident to the electroabsorption modulator 24, the optical signal Py' obtained by the sampling being emitted from another terminal 24b of the two optical terminals 24a, 24b; and a step of preparing an optical separator 26, 26' for selectively emitting an optical signal component Pz to be sampled, of the optical signals Py' emitted from the other terminal 24a of the two optical terminals 24a, 24b of the electroabsorption modulator 24.

The optical signal monitor apparatus 20 and method using the optical signal sampling apparatus 100 and method according to this invention are explained below specifically with reference to FIG. 1.

The optical signal monitor apparatus 20 and method using the optical signal sampling apparatus 100 and method according to the invention are intended to monitor (sample) the optical signal Px modulated with the data signal having a predetermined clock period Tc transmitted on the optical network not shown.

In a sampling light pulse generating unit 21, a sampling light pulse Ps having a period Ts different by a predetermined offset time ΔT from an integer N multiple of a clock period Tc of a data signal modulating the optical signal Px to be monitored (sampled) is generated and applied to an optical sampling unit 22.

The sampling light pulse generating unit 21 and the optical sampling unit 22 make up the optical signal sampling apparatus 100 according to the invention.

The sampling light pulse generating unit 21 may have an arbitrary configuration as long as an optical pulse of a narrow width can be generated at a designated period Ts as described above.

Figure 2:
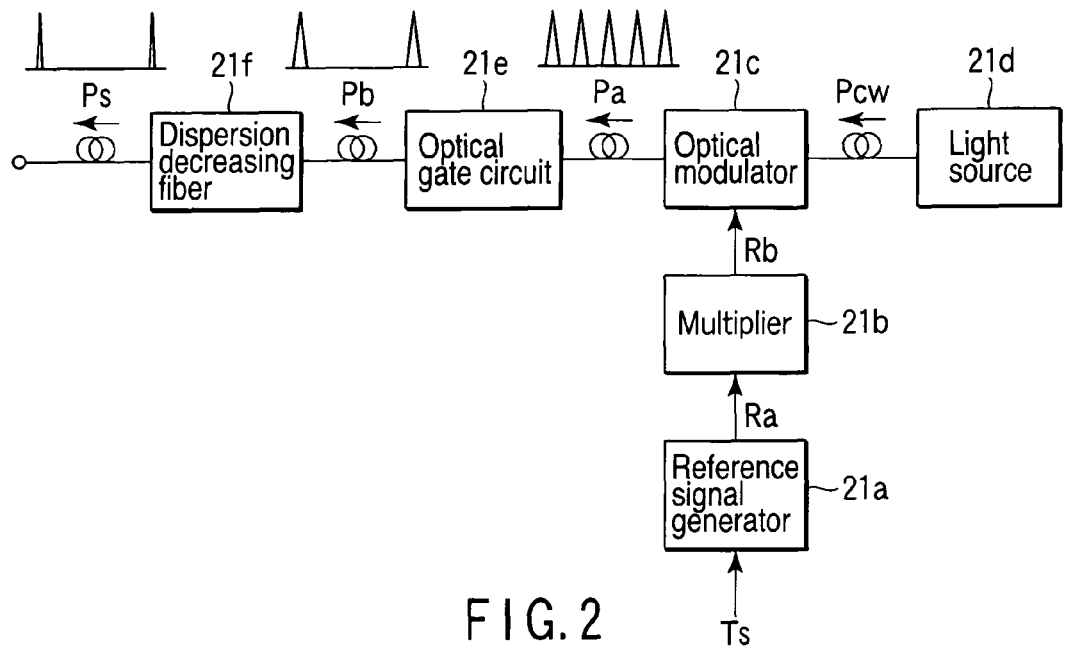
FIG. 2 is a block diagram shown for explaining an example of the configuration of the essential parts of FIG. 1.

FIG. 2 is a block diagram showing an example of the sampling light pulse generating unit 21.

This sampling light pulse generating unit 21 includes a reference signal generator 21a configured as a synthesizer for generating a stable signal Ra having a period Ts corresponding to the period of the sampling light pulse Ps, a multiplier 21b for multiplying the stable signal Ra having the period Ts (frequency Fs) generated by the reference signal generator 21a, by M (M: integer larger than 1), and output as a signal Rb multiplied by M, a light source 21d for emitting continuous light Pcw, an optical modulator 21c for emitting an optical pulse Pa having a period Ts/M by modulating the continuous light Pcw emitted from the light source 21d with the signal Rb M times larger than the signal Ra, output from the multiplier 21b, an optical gate circuit 21e for thinning the optical pulse Pa emitted from the optical modulator 21c to 1/M and converting it into an optical pulse Pb having a period Ts, and a dispersion decreasing fiber 21f for further narrowing the pulse width of the optical pulse Pb having the period Ts converted by the optical gate circuit 21e and emitting as the sampling light pulse Ps.

Specifically, the reference signal generator 21a having a configuration as a synthesizer generates the stable signal Ra having the period Ts (frequency Fs) designated from the parameter setting unit 28 described later. The signal Ra thus generated is input to the multiplier 21b and multiplied by M (M: integer larger than 1), after which the output signal Rb is input to the optical modulator 21c where the continuous light Pcw emitted from the light source 21d is modulated thereby to generate the optical pulse Pa having the period Ts/M.

The pulse width of this optical pulse Pa is reduced to 1/M as compared with the case in which the continuous light Pcw is modulated directly by the signal Ra.

The optical pulse Pa is thinned to 1/M by the optical gate circuit 21e and, after being converted into the optical pulse Pb of period Ts, applied to the dispersion decreasing fiber 21f, where the pulse width thereof is further narrowed, and finally emitted as the sampling light pulse Ps.

The optical sampling unit 22, on the other hand, samples the optical signal Px to be monitored (sampled), by the sampling light pulse Ps emitted from the sampling light pulse generator 21, and emits the optical pulse signal Pz obtained by the sampling operation.

The optical sampling unit 22 provides for the case in which the wavelength of the sampling light pulse Ps is different from that of the optical signal Px to be monitored, and includes an optical coupler 23 as an optical combiner, an electroabsorption modulator 24, a DC power supply 25 and a wavelength filter 26 as an optical separator.

The electroabsorption modulator 24, as described above, has two optical terminals 24a, 24b for inputting/outputting the light and a power supply terminal 24c for applying the electric field to the light path between the two optical terminals 24a, 24b. The electroabsorption modulator 24 has such a characteristic that an absorption rate of the light propagating through the light path is changed in accordance with the magnitude of the electric field applied to the light path.

Normally, in the electroabsorption modulator of this type, as disclosed in Patent Document 2, the power supply terminal 24c is supplied with a pulse signal of electricity for sampling.

However, it is very difficult to generate the pulse signal of electricity having a narrow width required to acquire the waveform information of several tens of Gb/s described above.

In view of this, according to this embodiment, as shown in FIG. 1, the multiplexed light Py of the optical signal Px and the sampling light pulse Ps having a narrow width described above is applied to the optical terminal 24*a*. Also, as shown by the optical absorption characteristic F in FIG. 3, a predetermined DC voltage Vdc exhibits a high absorption rate α (for example, 20 dB) in the absence of the sampling light pulse Ps incident to the optical terminal 24*a*, while in the presence of the incident sampling light pulse Ps, on the other hand, the DC voltage Vdc assumes a low absorption rate β (for example, 3 dB) due to the mutual absorption saturation characteristic. This DC voltage Vdc is applied from the DC power supply 25 to the power supply terminal 24*c*.

Figure 3:
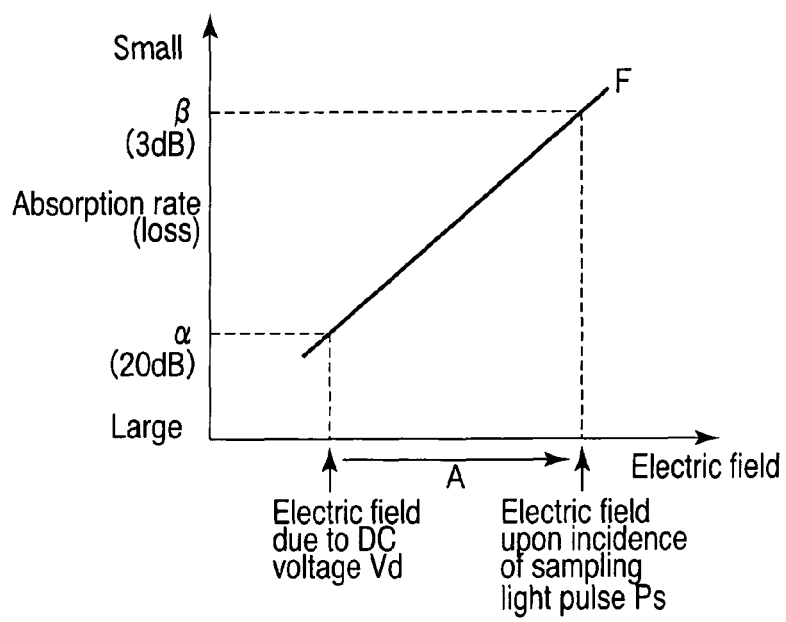
FIG. 3 is a diagram shown for explaining an example of the characteristics of the essential parts of FIG. 1.

The characteristic F of FIG. 3 is shown as a model.

As a result, only in the presence of the incident sampling light pulse Ps, the absorption rate of the electroabsorption modulator 24 is reduced and the multiplexed light Py' is emitted from the other optical terminal 24*b*.

Since the multiplexed light Py' contains also the component of the sampling light pulse Ps, only the wavelength component of the optical signal Px is extracted from the multiplexed light Py' by the wavelength filter 26 constituting an optical separator, and emitted as an optical pulse signal Pz.

In the process, the sampling efficiency is determined by the insertion loss of the electroabsorption modulator 24 and about −10 dB, which is improved 10 dB or more than in the case where the bulk-type nonlinear optical member is used.

Also, the period Ts of the sampling light pulse Ps and the sampling clock Es output from the sampling light pulse generator 21 is set by the parameter setting unit 28.

The parameter setting unit 28, receiving the information on the offset time ΔT and the clock period Tc (which may alternatively be the bit rate) of the data signal modulating the optical signal Px to be monitored, determines the sampling period Ts by the arithmetic operation $$Ts = N \cdot Tc + \Delta T$$

and this value is set in the sampling light pulse generating unit 21.

The value N is determined by the variable frequency range of the signal adapted to be output from the sampling light pulse generating unit 21 and the clock period Tc of the data signal.

Assume, for example, that ΔT is negligibly small as compared with Ts, Tc is about 0.1 ns (10 GHz) and Ts is variable in the neighborhood of 0.1 μs (10 MHz), the value N is about Ts/Tc=1000.

The optical pulse signal Pz emitted from the sampling unit 22 enters the photoelectric converter 30 and is converted to the electric signal Ez.

The output signal Ez from the photoelectric converter 30, after sampled and converted to a digital value by an analog/digital (A/D) converter 31, is input to an arithmetic operation unit 35.

The sampling operation of the A/D converter 31 is performed by the sampling clock Es in synchronism with the sampling light pulse Ps.

According to this embodiment, this electricity sampling clock Es is also output from the sampling light pulse generating unit 21 (the reference signal generator 21*a* described above).

The arithmetic operation unit 35, based on the signal Ez converted to a digital value by the A/D converter 31, calculates the value indicating the quality of the optical signal Px to be monitored.

This arithmetic operation, is arbitrary performed in such a manner that, as described in Patent Document 1, for example, the signal Ez is retrieved as a sample value for a predetermined time, and after being compared with a predetermined threshold value, separated into a sample value associated with the data "1" and a sample value associated with the data "0". For each of these data, the average values and the standard deviations of the sample value group are determined, and the quality value Q is determined as a ratio μ/γ between the difference μ of the average values and the sum γ of the standard deviations.

Incidentally, the larger the value Q, the higher the signal quality of the optical signal Px to be monitored.

The quality value Q is calculated, for example, at predetermined time intervals, and the result thereof is notified to an outward device at a predetermined timing.

The value indicating the signal quality of the optical signal Px to be monitored is not limited to the Q value, but may be another statistic quantity.

Next, an explanation is given about the relation between the waveform of the optical signal Px to be monitored and the acquisition timing thereof required to calculate the value indicating the quality of the optical signal Px to be monitored.

Figure 4:
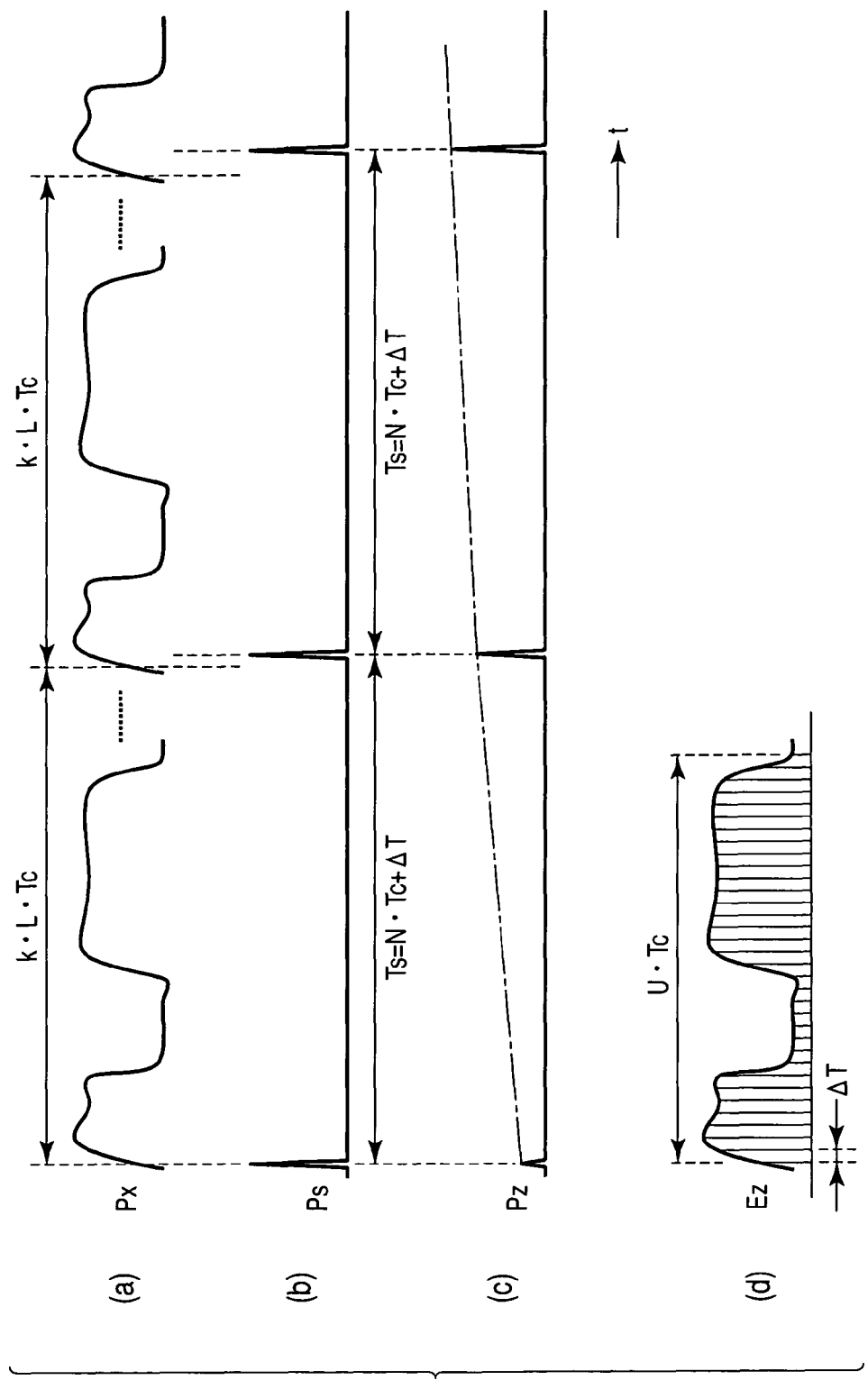
FIG. 4 is a waveform diagram shown for explaining the operation against the optical signal having a repetitive waveform as the operation of the first embodiment configured as shown in FIG. 1.

In the case where the optical signal Px to be monitored is used for testing and repeatedly modulated for a predetermined code string of a predetermined bit length L as shown in (a) of FIG. 4, then the value N determining the period Ts of the sampling light pulse Ps is made equal to K times (K: integer) the bit length L as shown in (b) of FIG. 4. In this way, the repetitive waveform of the optical signal Px can be sampled in time series at intervals of ΔT as shown in (c) of FIG. 4.

This sampling operation is performed U·Tc/ΔT times (U: integer) continuously as shown in (d) of FIG. 4. Thus, the waveform data of U bits can be obtained in time series from the sampling start timing.

Figure 5:
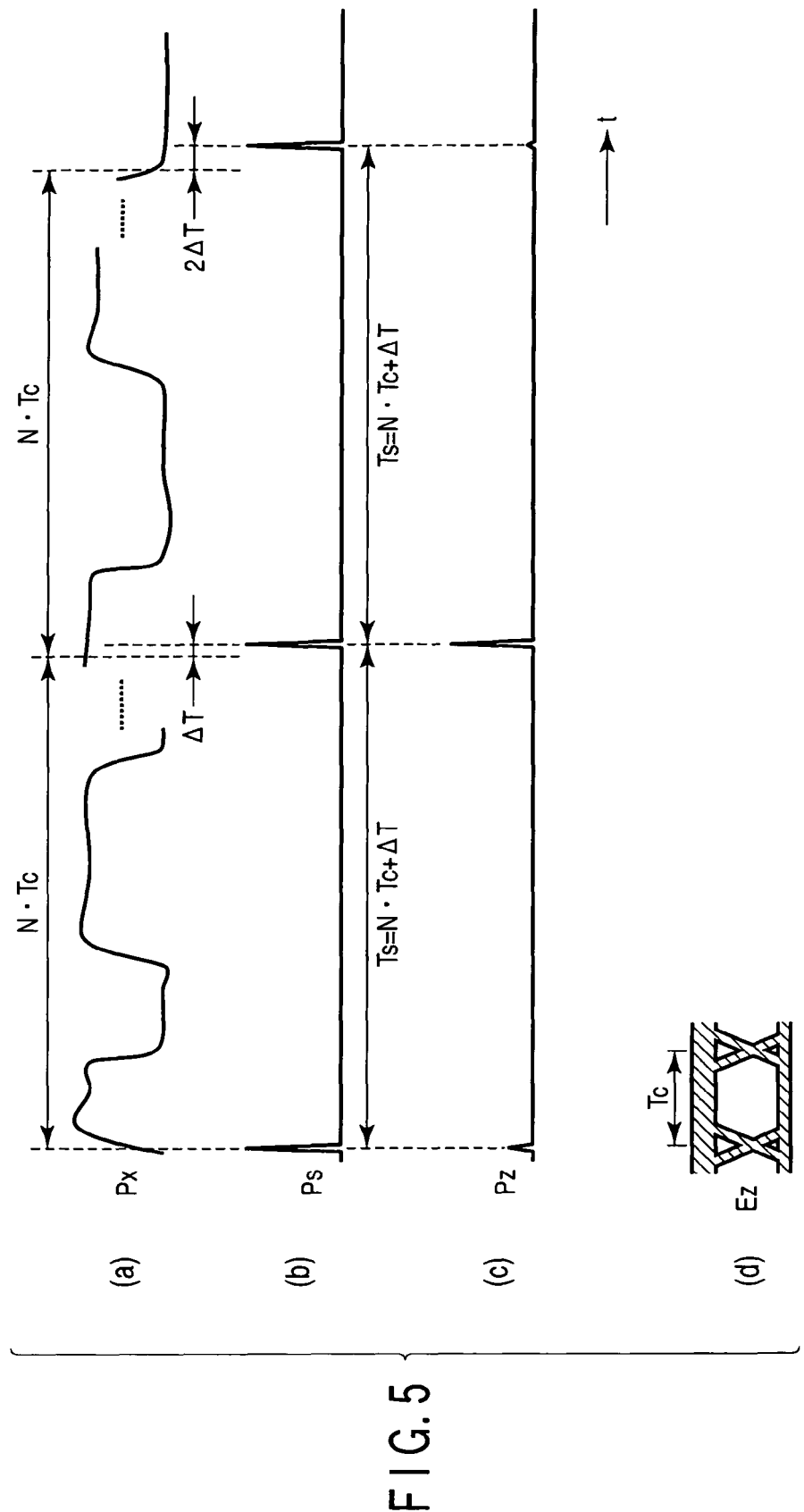
FIG. 5 is a waveform diagram shown for explaining the operation against the optical signal having no repetitive waveform as the operation of the first embodiment configured as shown in FIG. 1.

The optical signal Px actually transmitted on the optical network is not necessarily a repetitive waveform as shown in (a) of FIG. 5.

Assume that this optical signal Px is sampled with a period Ts equal to N·Tc+ΔT as shown in (b) of FIG. 5. In view of the fact that the data for every N bits of the optical signal Px are sampled at timings different by ΔT, respectively, the value obtained by sampling has an amplitude corresponding to the data "1", "0" or an amplitude in transition state between the data, as shown in (c) of FIG. 5. Therefore, the sampling result on the waveform continuous for a predetermined period of the optical signal Px is not obtained.

By the continuous sampling operation for a predetermined number of plural bits as described above and thus obtaining the statistic quantity thereof, the quality value Q can be determined.

Also, in an application to the sync sampling, on the other hand, the sampling result for plural bits is superposed over the 1-bit width. In this way, an eye pattern as shown in (d) of FIG. 5 is obtained, and the signal quality may be determined from this eye pattern.

Incidentally, in the case where the sampling period is displaced from the bit rate of the data signal modulating the optical signal (asynchronous state), the observed waveform obtained by superposition would be deviated and the eye pattern could not be observed.

By the sampling operation at predetermined time period as described, however, the statistic quantity and the quality value Q can be obtained.

Second Embodiment

Figure 6:
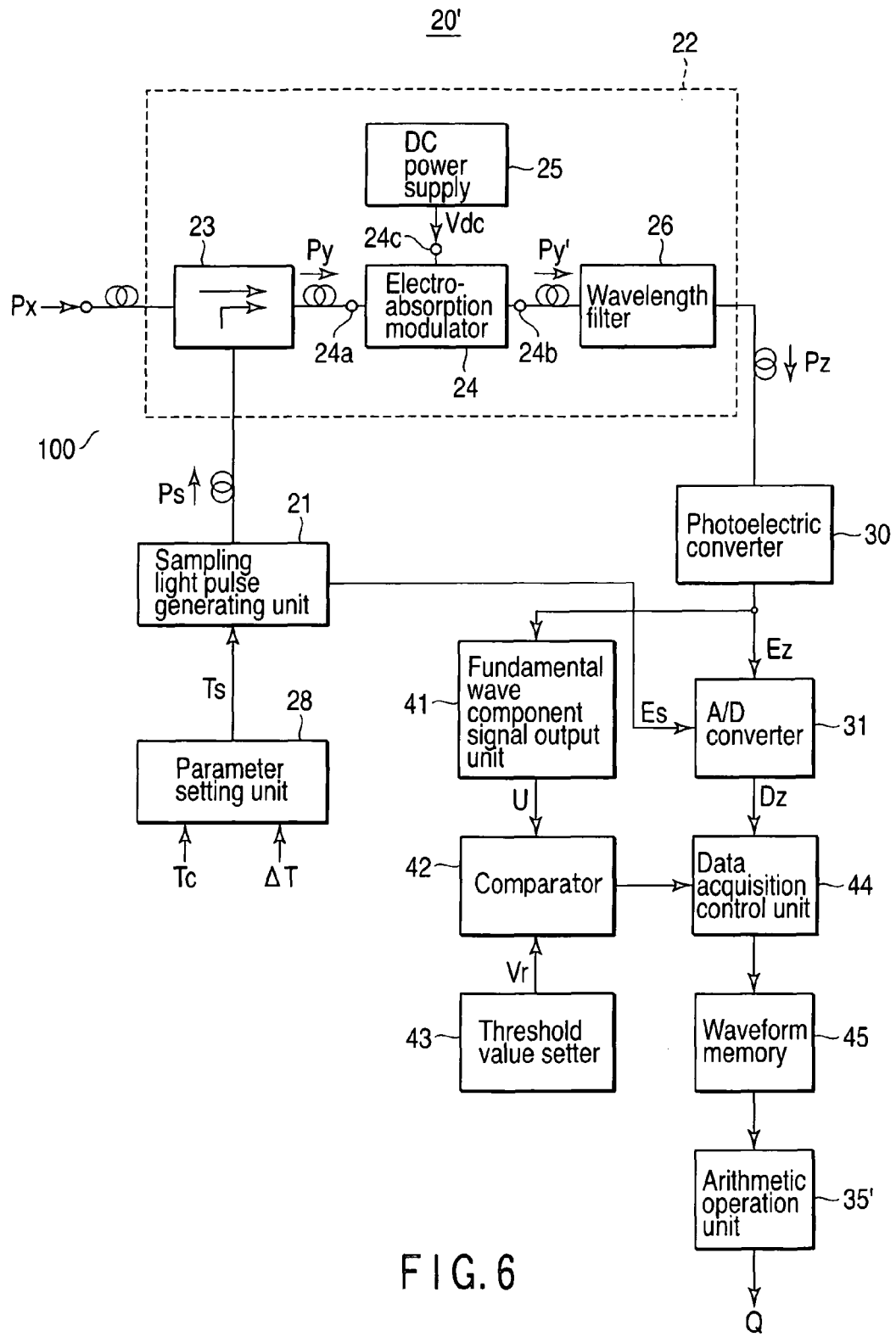
FIG. 6 is a block diagram shown for explaining the configuration of the optical signal sampling apparatus and method and the optical signal monitor apparatus and method using the same according to a second embodiment of the invention.

FIG. 6 is a block diagram shown for explaining the configuration of the optical signal sync sampling apparatus 100 and the optical signal monitor apparatus 20' using the sampling apparatus 100 according to a second embodiment of the invention.

An example of the configuration of the optical signal monitor apparatus 20' always capable of holding the synchronous state is shown in FIG. 6.

In the optical signal monitor apparatus 20', the sampling light pulse generating unit 21, the optical sampling apparatus 22, the parameter setting unit 28, the photoelectric converter 30 and the A/D converter 31 are equivalent to the corresponding component parts of the first embodiment and therefore not described again.

In the optical signal monitor apparatus 20', the output signal Ez of the photoelectric converter 30 is input to the fundamental wave component signal output unit 41.

The fundamental wave component signal output unit 41 is for outputting the fundamental wave component signal U having a frequency equal to that of the fundamental wave component of the envelope wave of the signal Ez output in pulse form from the photoelectric converter 30.

The fundamental wave component signal output unit 41 may be formed of either a filter type or PLL (phase-locked loop) type.

In the filter type, the sinusoidal fundamental wave component signal U is extracted by a narrow-band bandpass filter having the central frequency (for RZ scheme) equal to the clock frequency Fc of the data signal modulating the optical signal or the central frequency (for NRZ scheme) twice as high as the clock frequency Fc.

Figure 7:
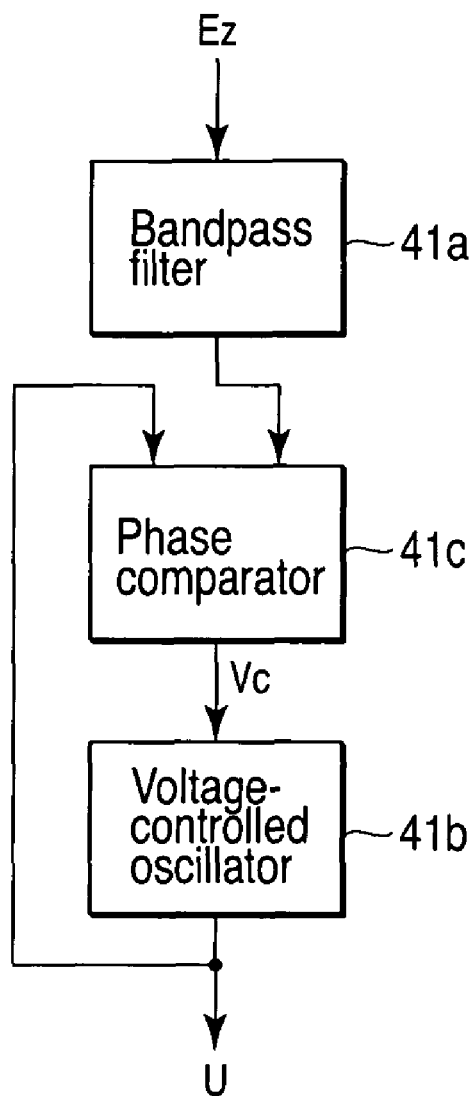
FIG. 7 is a block diagram shown for explaining an example of the configuration of the essential parts of FIG. 6.

In the PLL type, on the other hand, as shown in FIG. 7, the output signal of the narrow-band bandpass filter 41a described above and the output signal of a voltage controlled oscillator 41b are input to a phase comparator 41c, and the oscillation frequency of the voltage-controlled oscillator 41b is controlled by the control signal Vc corresponding to the phase difference between the two output signals. In this way, the phase of the oscillation output signal is synchronized with the output signal of the bandpass filter 41a, and this synchronous sinusoidal oscillation output signal is used as the fundamental wave component signal U.

As another example, the output signal Ez of the photoelectric converter 30 is input to a fast Fourier transform (FFT) operation unit for frequency analysis thereby to determine the frequency of the fundamental wave component. The fundamental wave component signal U having a frequency equal to the frequency thus determined is generated and output from a signal generator.

Assuming that the clock frequency Fc of the optical signal Px is 10 GHz and the offset time $\Delta T$ is 0.1 ps, 1000 sampling sessions are required to obtain the 1-bit waveform data of the optical signal Px. The time required for conducting the 1000 sampling sessions with the frequency Fs of about 10 MHz is approximately 0.1 ms. This time is equal to the period of the fundamental wave component of the envelope wave of the signal Ez having the frequency of about 10 kHz.

The fundamental wave component signal U is input to the comparator 42 and compared with the threshold value Vr preset by a threshold value setter 43. The comparison result is input to a data acquisition control unit 44.

The data acquisition control unit 44, based on the output signal of the comparator 42, writes the data signal Dz of the A/D converter 31 in a waveform memory 45.

Specifically, from the timing when the fundamental wave component signal U exceeds the threshold value Vr upward, for example, the data signal Dz starts to be written into the waveform memory 45, and upon complete writing of a predetermined number W of the data signal, the operation stands by until the timing when the fundamental wave component signal U exceeds the threshold value Vr upward. This operation is repeated a predetermined number H of times.

Incidentally, the predetermined number W of the data signal Dz are written at H different plural areas of the waveform memory 45 in the order of the address.

The arithmetic operation unit 35', like the arithmetic operation unit 35 according to the first embodiment, calculates the value indicating the quality of the optical signal Px to be monitored, based on the data signal Dz written in the waveform memory 45.

Next, the relation between the waveform of the optical signal Px to be monitored and the acquisition timing thereof according to the second embodiment is explained.

Figure 8:
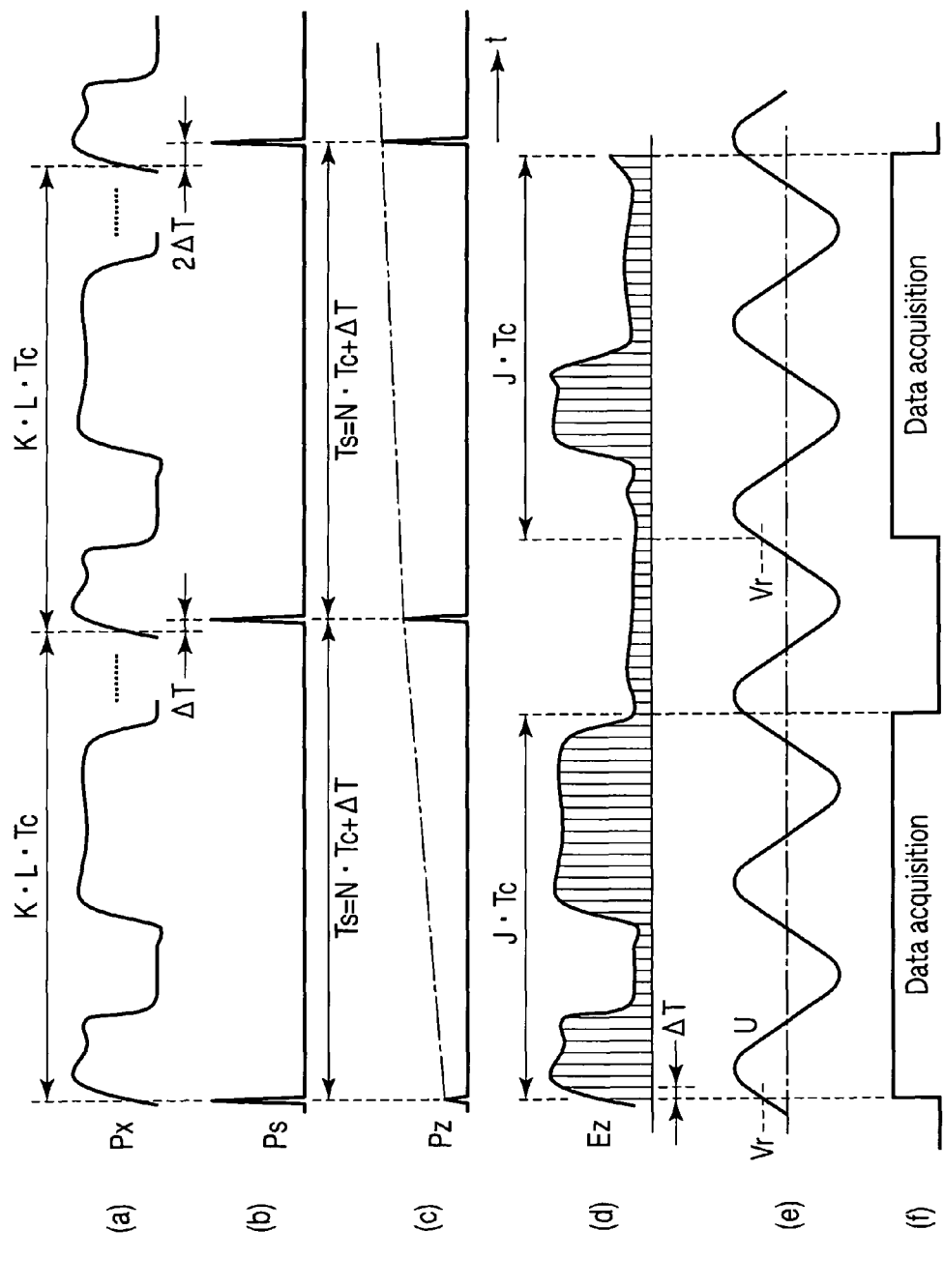
FIG. 8 is a waveform diagram shown for explaining the operation against the optical signal having a repetitive waveform as the operation of the second embodiment configured as shown in FIG. 6.

In the case where the optical signal Px to be monitored is for test operation, for example, and repeatedly modulated in a predetermined code string of a predetermined bit length L as shown in (a) of FIG. 8, then, as shown in (b) of FIG. 8, the sampling operation is performed while the value N determining the period Ts of the sampling light pulse Ps is equal to a value K (K: integer) times larger than the bit length L. In this way, as shown in (c) and (d) of FIG. 8, an optical pulse Pz having an envelope waveform of an enlarged time axis of the optical signal Px is obtained.

Then, from the light receiving signal Ez of this optical pulse signal Pz, the sinusoidal fundamental wave component signal U as shown in (e) of FIG. 8 is obtained.

From the timing when the fundamental wave component signal U exceeds the threshold value Vr, the data acquisition is started as shown in (f) of FIG. 8, so that the data for $J \cdot Tc/\Delta T$ times sampling operations (U: integer) is acquired.

The arithmetic operation described above is performed on this J-bit waveform data thereby to determine the Q value.

Incidentally, the time axis is shown in shorter scale in (d) to (f) of FIG. 8.

Figure 9:
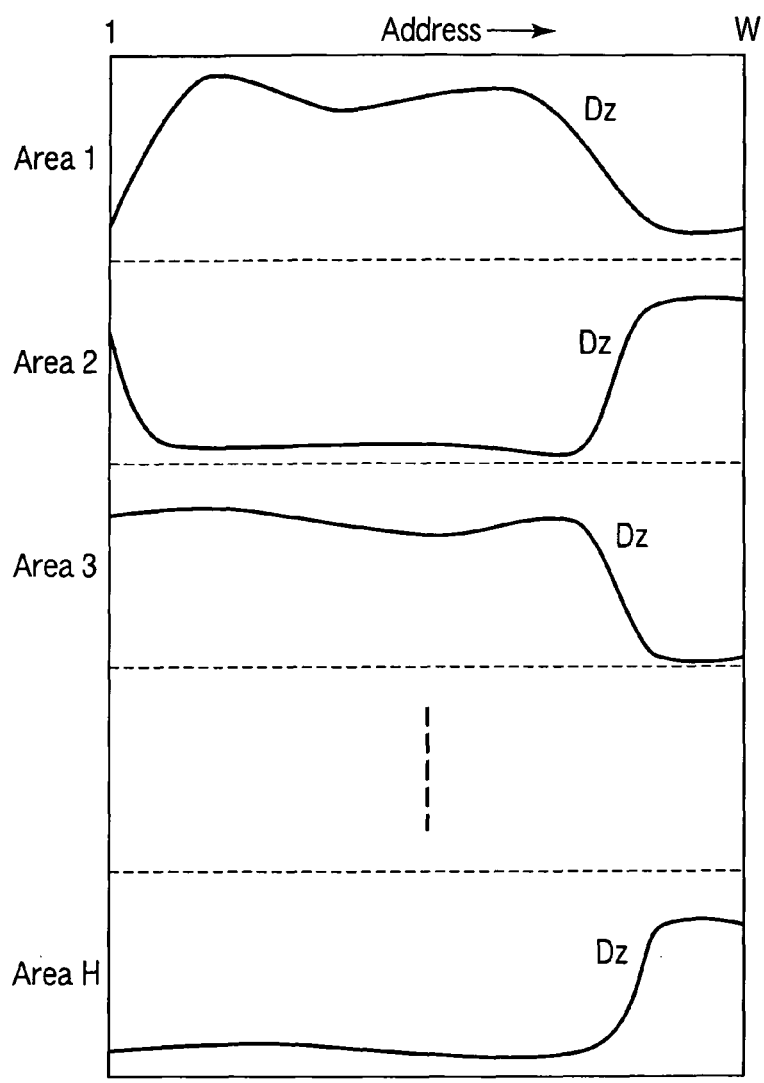
FIG. 9 is a waveform diagram shown for explaining an example of storage of the waveform obtained by sampling as the operation according to the second embodiment configured as shown in FIG. 6.

In obtaining eye patterns, on the other hand, as shown in (d) to (f) of FIG. 8, the waveform data acquisition is started from the timing when the fundamental wave component signal U exceeds the threshold value Vr, so that the process for J bits is executed plural times and stored in different areas 1 to H of the waveform memory 45 as shown in FIG. 9.

Figure 10:
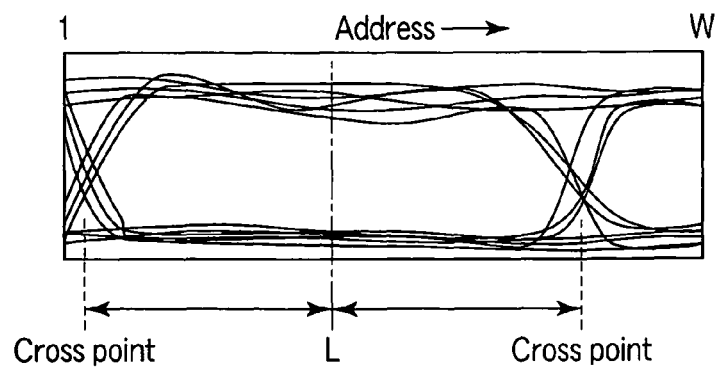
FIG. 10 is a waveform diagram shown for explaining the eye pattern obtained by superpositioning of the waveforms stored in FIG. 9.

These waveform data Dz in the plural areas are superposed in the order of the address thereby to obtain the eye pattern as shown in FIG. 10.

The head data of these waveform data is equal to a value sampled immediately after the timing when the fundamental wave component signal U exceeds the threshold value Vr and synchronized exactly with the data signal. Therefore, the time axis of the waveform data superposed is not greatly displaced, and the amplitude variation of the optical signal is expressed substantially accurately.

The relation between the quality and the position in the bit is determined on this eye pattern.

For example, the value Q is calculated based on the sample value at an intermediate point L (intermediate point of 1 bit) of two cross points as shown in FIG. 10, and together with the Q value of the whole data irrespective of the position described above, notified to other devices through a communication means not shown.

Figure 11:
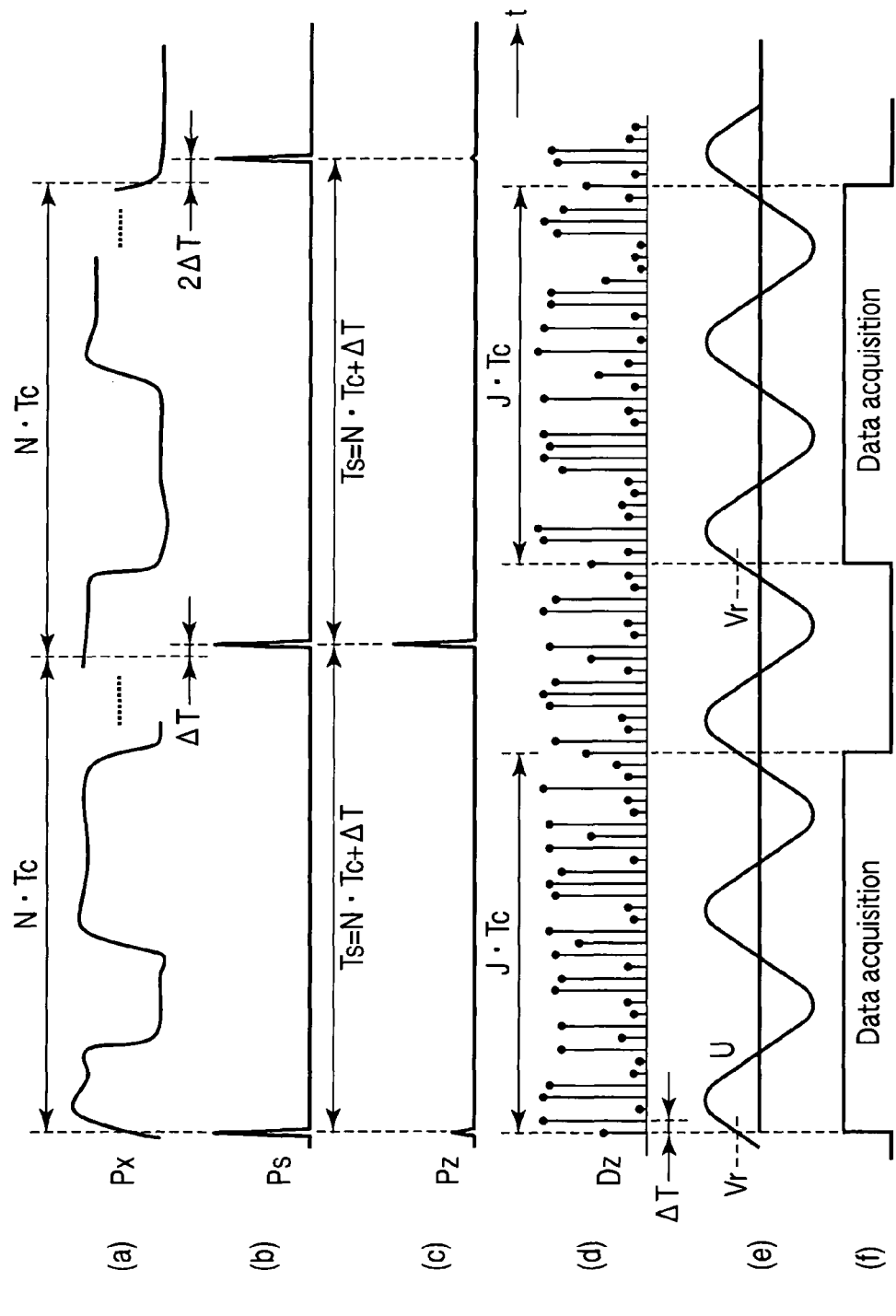
FIG. 11 is a waveform diagram shown for explaining the operation against the optical signal having no repetitive waveform as the operation of the second embodiment configured as shown in FIG. 6.

Incidentally, the optical signal Px actually transmitted on the optical network is not limited to the repetitive waveform shown in (a) of FIG. 11.

In the case where this optical signal Px is sampled with the period Ts equal to N·Tc+ΔT as shown in (b) of FIG. 11, the sample timing is different by ΔT for every N bits of the optical signal Px. Thus, the peak value of the optical pulse signal Pz obtained by the sampling, as shown in (c) of FIG. 11 and (d) of FIG. 11 on a shorter time scale, is either the amplitude corresponding to the data "1", "0" or the amplitude in the transition state therebetween. Thus, the envelope wave of an enlarged continuous waveform for a predetermined period of the optical signal Px is not obtained.

This envelope wave contains the fundamental wave component of the data signal modulating the optical signal Px, and this fundamental wave component signal U is obtained as shown in (e) of FIG. 11.

As in the case described above, the data acquisition is started as shown in (f) of FIG. 11 at the timing when the fundamental wave component signal U exceeds the threshold value Vr, and the data is acquired by J·Tc/ΔT times sample sessions (U: integer).

The Q value can be determined by performing a similar arithmetic operation described above on the J-bit waveform data.

Incidentally, the time axis is shown in shorter scale in (d) to (f) of FIG. 11.

This J-bit waveform data itself may be said to indicate the eye pattern. To obtain an eye pattern accurately indicating the quality of the optical signal using a greater number of sample values, however, as shown in (d) to (f) of FIG. 11, the acquisition of the waveform data is started from the timing when the fundamental wave component signal U exceeds the threshold value Vr and conducted for J bits. This process is repeated H times and as in the aforementioned case, stored in different areas 1 to H of the waveform memory 45. By superposing this data in the order of address, an accurate eye pattern can be obtained.

Also in this case, the head data of each waveform data has a value sampled immediately after the timing when the fundamental wave component signal U exceeds the threshold value Vr and is accurately synchronized with the data signal. Thus, the waveform data is not superposed with the time axis greatly displaced, and indicates the amplitude variation of the optical signal in substantially accurate manner.

The optical sampling unit 22 used for the optical signal monitor apparatus 20, 20' according to each embodiment described above includes the electroabsorption modulator 24 as a sampling element. One of the optical terminals of the modulator 24 is supplied with the multiplexed signal of the optical signal to be sampled and the sampling light pulse. The power supply terminal, on the other hand, is supplied with a predetermined DC voltage indicating a high absorption rate in the absence of the incident sampling light pulse and a low absorption rate in the presence of the incident sampling light pulse, so that in the presence of the incident sampling light pulse, the component of the optical signal is selectively emitted from the light from the other optical terminal.

As a result, the optical pulse having a narrow width can be used for sampling, and in addition, the loss of the optical signal can be reduced. Thus, the sampling efficiency is substantively improved, and the accurate waveform information can be obtained even for a weak optical signal.

Also, in the case where the fundamental wave component signal U is obtained from the signal produced by sampling and the timing to start the waveform acquisition is synchronized as in the optical signal monitor apparatus 20' according to the second embodiment, the time axis is not likely to be displaced greatly and the eye pattern of the optical signal can be obtained in stable fashion even when the data signals Dz acquired for different periods are superposed.

Incidentally, instead of determining the quality value or the eye pattern through the arithmetic operation unit 35, 35' as in the first and second embodiments, the arithmetic operation unit 35' may be done without and the data written in each area of the waveform memory 45 may be transmitted to an external device through a communication means not shown thereby to display the arithmetic operation on the quality and the eye pattern on the particular external device.

In the optical sampling unit 22 used for the optical signal monitor apparatus 20, 20' according to the first and second embodiments, the optical signal Px and the sampling light pulse Ps of different wavelengths are multiplexed with each other and applied to one optical terminal 24a of the electroabsorption modulator 24, while the wavelength component of the optical signal is separated and extracted from the light emitted from the other optical terminal 24b thereby to sample the optical signal.

It is also possible, as in the third embodiment described later, to sample the optical signal irrespective of the wavelength by controlling the polarized waves of the optical signal Px to be monitored and the sampling light pulse Ps.

Also, in the sampling light pulse generating unit 21 making up the optical signal sampling apparatus 100 used for the optical signal monitor apparatus 20, 20' according to the first and second embodiments, the optical pulse having a narrow width is generated as the sampling light pulse Ps for sampling the optical signal Px to be monitored, with the period Ts=N·Tc+ΔT designated by the parameter setting unit 28. The repetitive waveform of the optical signal Px to be monitored is then sampled at time intervals of, for example, ΔT in time series as shown in (c) of FIG. 4. At the same time, as shown in (d) of FIG. 4, the optical signal Px is sampled U·Tc/ΔT times (U: integer) continuously thereby to obtain the waveform data of U bits in time series from the sampling start timing.

Specifically, in this case, the time axis of the waveform data finally obtained is calibrated into a state desirable for evaluation of the waveform data. On the other hand, this gives rise to the requirement of an expensive sampling light pulse generating unit 21 having a complicated configuration as shown in FIG. 2.

Nevertheless, the calibration of the time axis of the waveform data finally obtained may not be required in some case as an optical signal monitor apparatus. In such a case, as in the fourth and fifth embodiments described later, an inexpensive sampling light pulse generating unit having a simple configuration may be used in place of the expensive sampling light pulse generating unit 21 having a complicated configuration as shown in FIG. 2.

Third Embodiment

Figure 12:
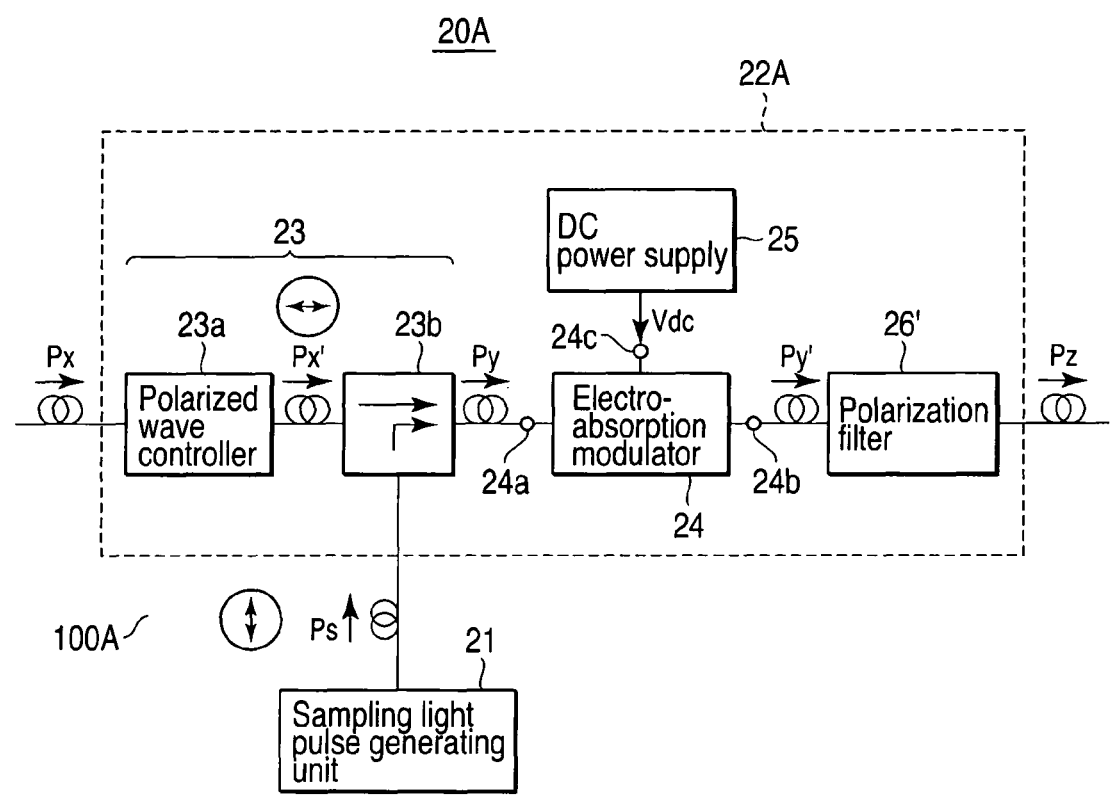
FIG. 12 is a block diagram shown for explaining the configuration of the optical signal sampling apparatus and method and the optical signal monitor apparatus and method using the same according to a third embodiment of the invention.

FIG. 12 is a block diagram shown for explaining the configuration of the optical signal sampling apparatus 100A and the optical signal monitor apparatus 20A using the apparatus 100A according to the third embodiment of the invention.

Specifically, in the optical sampling unit 22A making up the optical signal sampling apparatus 100A shown in FIG. 12, the optical signal Px to be monitored enters the polarized wave controller 23a, and the direction of polarization thereof is set orthogonal to the direction of polarization of the sampling light pulse Ps, after which the resulting light, together with the sampling light pulse Ps, is applied to and multiplexed in the optical coupler 23*b* of polarization multiplexing type making up the optical combiner 23. The multiplexed light Py' is applied to one optical terminal 24*a* of the electroabsorption modulator 24, and among the light rays emitted from the other optical terminal 24*b*, only the polarized component Pz of the optical signal Px is selected by the polarization filter 26' as an optical separator.

The sampling light pulse generating unit 21 of this optical signal monitor apparatus 20A generates the sampling light pulse Ps having the direction of polarization orthogonal to the direction of polarization of the optical signal Px to be monitored.

As the polarized wave controller 23*a*, any one of the polarization controller, the polarization plate and the polarized beam splitter can be used. Also, as the polarization filter 26', the polarization plate or the polarized beam splitter can be used.

The other elements of the configuration of the optical signal monitor apparatus 20A is equivalent to that of the first and second embodiments, and therefore, not explained again.

Fourth Embodiment

FIG. 13 is a block diagram shown for explaining the configuration of the optical signal sampling apparatus 100B and the optical signal monitor apparatus 20B using the apparatus 100B according to the fourth embodiment of the invention.

Specifically, the sampling light pulse generating unit 21B making up the optical signal sampling apparatus 100B shown in FIG. 13, in which the time axis of the waveform data finally obtained is not required to be calibrated, is configured of a short pulse generating unit 21*g* which has the function of self-oscillating a short pulse Ps' having the frequency different by one integer-th from the frequency of the optical signal Px to be sampled on the one hand and shifting the frequency of the short pulse Ps' by about ±5% (5 kHz, for example) of the frequency (10 MHz, for example) of the short pulse Ps' on the other hand.

This short pulse generating unit 21*g* may be, for example, a mode lock fiber laser (MLFL) disclosed in Patent Document 3 described above and can realize an inexpensive sampling light pulse generating unit having a simple configuration.

The other elements of the configuration of this optical signal monitor apparatus 20B is equivalent to those of the first embodiment shown in FIG. 1, and therefore, not described again (except that the parameter setting unit 28 is not required).

Fifth Embodiment

Figure 14:
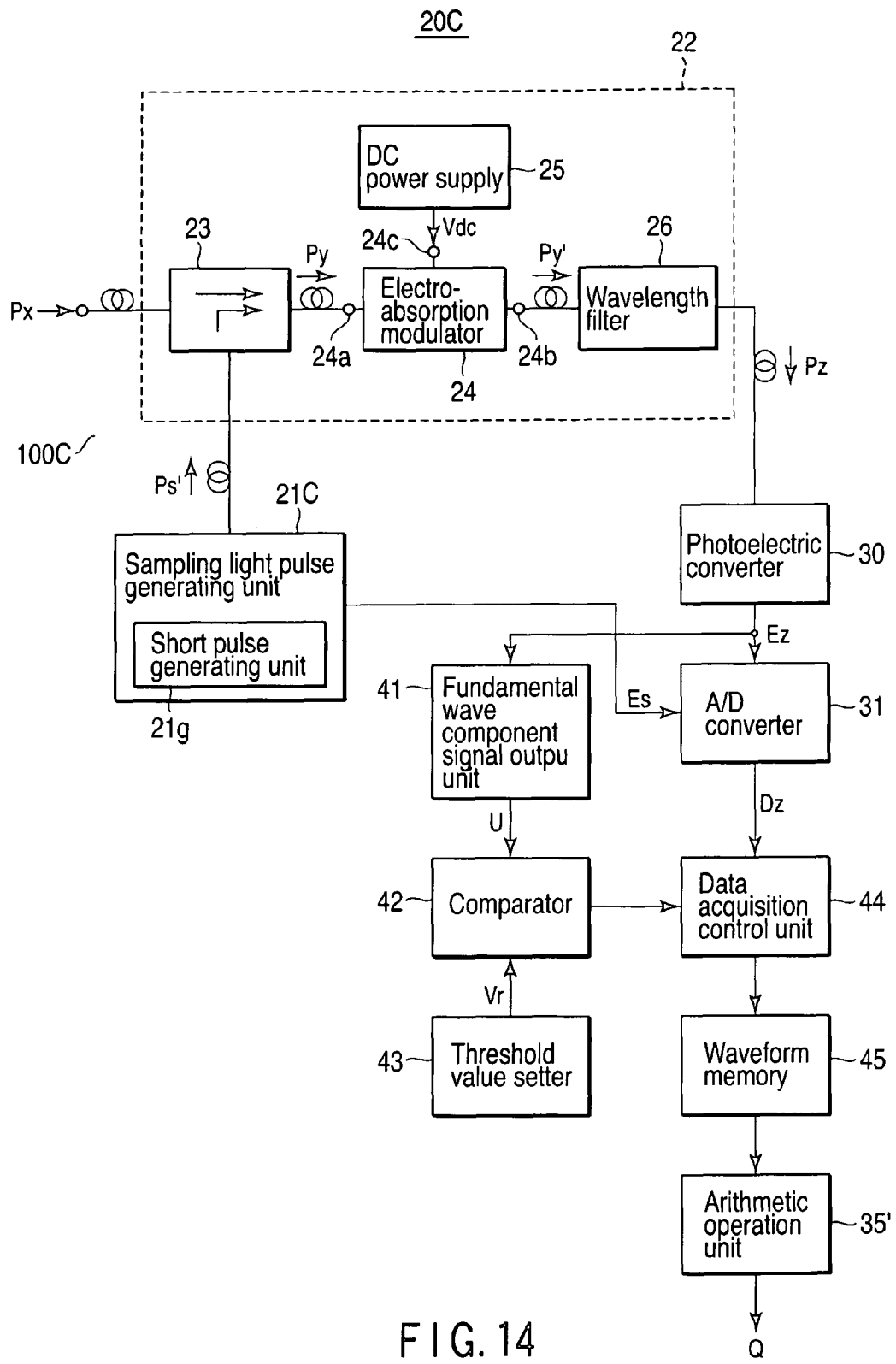
FIG. 14 is a block diagram shown for explaining the configuration of the optical signal sampling apparatus and method and the optical signal monitor apparatus and method using the same according to a fifth embodiment of the invention.
Figure 15:
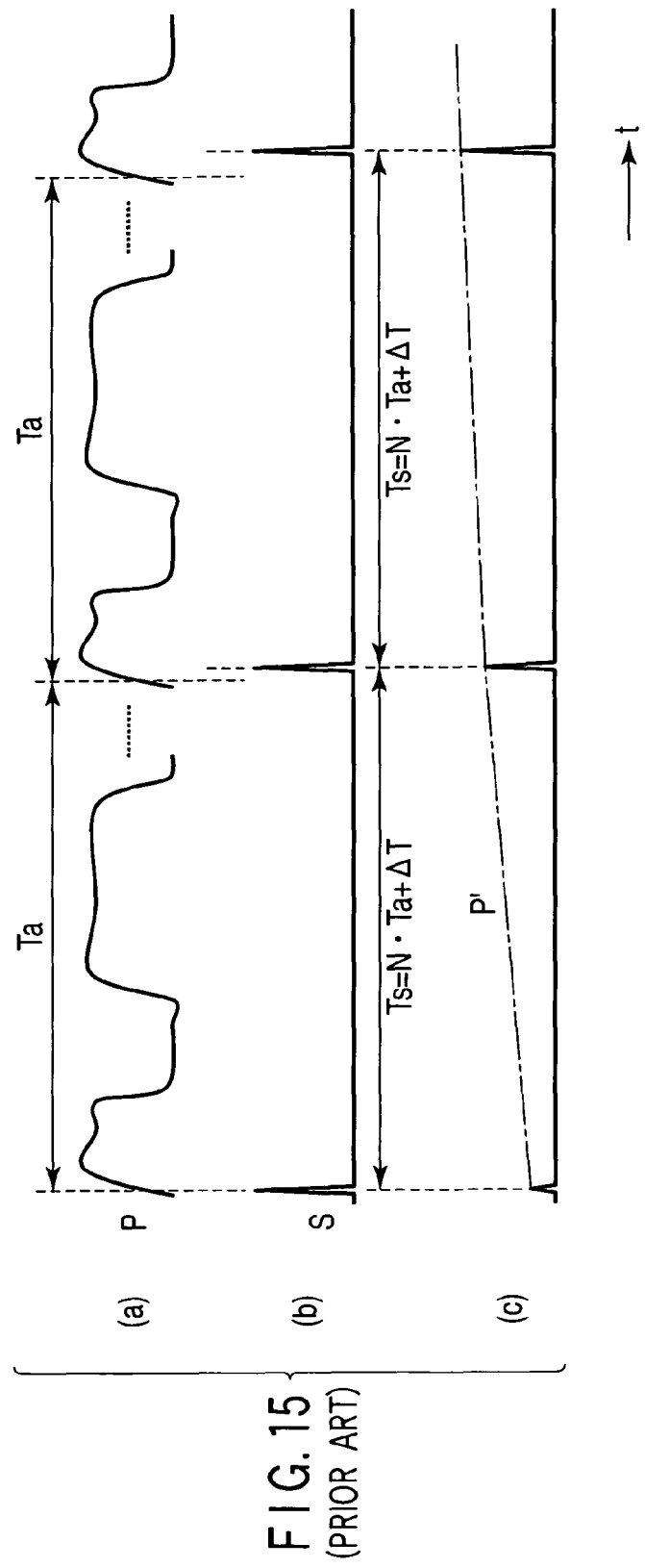
FIG. 15 is a waveform diagram shown for explaining the equivalent time sampling scheme employed for the conventional optical signal sampling apparatus.

FIG. 14 is a block diagram shown for explaining the configuration of the optical signal sampling apparatus 100C and the optical signal monitor apparatus 20C using the apparatus 100C according to the fifth embodiment of the invention.

Specifically, the sampling light pulse generating unit 21C making up the optical signal sampling apparatus 100C shown in FIG. 14, in which the time axis of the waveform data finally obtained is not required to be calibrated, is configured of a short pulse generating unit 21*g* which has the function of self-oscillating a short pulse having the frequency different by one integer-th from the frequency of the optical signal Px to be sampled on the one hand and shifting the frequency of the short pulse on the other hand.

This short pulse generating unit 21*g* may be, for example, a mode lock fiber laser (MLFL) disclosed in Patent Document 3 described above and can realize an inexpensive sampling light pulse generating unit having a simple configuration.

The other elements of the configuration of this optical signal monitor apparatus 20C is equivalent to those of the second embodiment shown in FIG. 6, and therefore, not described again (except that the parameter setting unit 28 is not required).

As described in detail above, according to this invention, there are provided an optical signal sampling apparatus and method for solving the problems of the prior art, having a high sampling efficiency and capable of sampling the waveform information of a fast optical signal accurately with a sufficient resolution, and an optical signal monitor apparatus and method capable of accurately monitoring the optical signal and obtaining an eye pattern of the optical signal in stable fashion using the optical signal sampling apparatus and method.

The invention claimed is:

1. An optical signal sampling apparatus comprising:
   a sampling light pulse generating unit which generates a sampling light pulse having a predetermined period to sample an optical signal to be sampled; and
   an optical sampling unit which samples the optical signal to be sampled, with the sampling light pulse from the sampling light pulse generating unit and emits an optical pulse signal obtained by the sampling,
   wherein the optical sampling unit includes:
   an optical combiner which combines the optical signal to be sampled and the sampling light pulse from the sampling light pulse generating unit with each other;
   an electroabsorption modulator having two optical terminals for inputting/outputting light and a power supply terminal for applying an electric field to an optical path connecting the two optical terminals, the electroabsorption modulator having such a characteristic that an absorption rate of the light propagating through the optical path is changed in accordance with the magnitude of the electric field, one terminal of the two optical terminals receiving the light emitted from the optical combiner;
   a DC power supply which applies, to the power supply terminal of the electroabsorption modulator, a predetermined DC voltage for sampling the optical signal to be sampled, with the sampling light pulse in the electroabsorption modulator by increasing the absorption rate in the absence of the sampling light pulse incident to the electroabsorption modulator and decreasing the absorption rate in the presence of the sampling light pulse incident to the electroabsorption modulator, thereby emitting an optical signal obtained by the sampling from another terminal of the two optical terminals; and
   an optical separator which selectively emits an optical signal component to be sampled, of the optical signal emitted from the other terminal of the two optical terminals of the electroabsorption modulator.

2. The optical signal sampling apparatus according to claim 1, wherein
   a wavelength of the sampling light pulse is different from a wavelength of the optical signal to be sampled, and
   the optical separator is configured of a wavelength filter for selectively emitting the optical pulse signal having a wavelength component of the optical signal to be sampled, of the optical signal emitted from the other terminal of the two optical terminals of the electroabsorption modulator.

3. The optical signal sampling apparatus according to claim 1, wherein
the optical combiner is configured to combine the optical signal to be sampled and the sampling light pulse with each other by means of polarized waves orthogonal to each other, and
the optical separator is configured of a polarization filter for selectively emitting the optical signal having a polarization component of the optical signal to be sampled, of the optical signal emitted from the other terminal of the two optical terminals of the electroabsorption modulator.

4. The optical signal sampling apparatus according to claim 1, wherein the sampling light pulse generating unit includes:
a reference signal generator configured as a synthesizer which generates a stable signal having a period Ts corresponding to the period of the sampling light pulse;
a multiplier which multiplies the stable signal having the period Ts generated by the reference signal generator, by M (M: integer larger than 1), and output as a signal multiplied by M;
a light source which emits continuous light;
an optical modulator which emits an optical pulse having a period Ts/M by modulating the continuous light emitted from the light source with the signal multiplied by M output from the multiplier;
an optical gate circuit which converts the optical pulse emitted from the optical modulator into an optical pulse having a period Ts by thinning the optical pulse to 1/M; and
a dispersion decreasing fiber which further narrows the pulse width of the optical pulse having the period Ts converted by the optical gate circuit and emits as the sampling light pulse.

5. The optical signal sampling apparatus according to claim 4, further comprising a parameter setting unit which receives the information on a clock period Tc of a data signal modulating the optical signal to be sampled or a bit rate and a predetermined offset time ΔT of the data signal, and determines the sampling period Ts of the sampling light pulse by an arithmetic operation of Ts=N·Tc+ΔT (where the value N is determined by the clock period Tc of the data signal and a frequency variable range of a signal capable of being output by the sampling light pulse generating unit), the determined sampling period Ts being set in the sampling light pulse generating unit.

6. The optical signal sampling apparatus according to claim 1, wherein the sampling light pulse generating unit is configured of a short pulse generating unit having a function of generating by self-excited oscillation a short pulse having a frequency different by one integer-th from the frequency of the optical signal to be sampled and shifting the short-pulse frequency.

7. An optical signal monitor apparatus comprising:
an optical signal sampling apparatus having a sampling light pulse generating unit which emits a sampling light pulse having a period different by a predetermined offset time from an integer multiple of a clock period of a data signal modulating an optical signal to be monitored; and
an optical sampling unit which samples the optical signal to be monitored, by the sampling light pulse from the sampling light pulse generating unit and emits an optical pulse signal obtained by the sampling; and
a photoelectric converter which receives the optical pulse signal emitted from the optical sampling unit of the optical signal sampling apparatus and converts the optical pulse signal into an electric signal thereby to acquire waveform information of the optical signal to be monitored,
wherein the optical sampling unit of the optical signal sampling apparatus includes:
an optical combiner which combines the optical signal to be monitored and the sampling light pulse from the sampling light pulse generating unit with each other;
an electroabsorption modulator having two optical terminals for inputting/outputting light and a power supply terminal for applying an electric field to an optical path connecting the two optical terminals, the electroabsorption modulator having such a characteristic that an absorption rate of the light propagating through the optical path changes in accordance with the magnitude of the electric field, one terminal of the two optical terminals receiving the light emitted from the optical combiner;
a DC power supply which increases the absorption rate in the absence of the sampling light pulse incident to the electroabsorption modulator and decreases the absorption rate in the presence of the sampling light pulse incident to the electroabsorption modulator so that the electroabsorption modulator samples the optical signal to be sampled, with the sampling light pulse and applies a predetermined DC voltage to the power supply terminal of the electroabsorption modulator to emit an optical signal obtained by the sampling from another terminal of the two optical terminals; and
an optical separator which selectively emits an optical signal component to be sampled, of the optical signals emitted from the other terminal of the two optical terminals of the electroabsorption modulator.

8. The optical signal monitor apparatus according to claim 7, wherein a wavelength of the sampling light pulse is different from a wavelength of the optical signal to be monitored, and
the optical separator of the optical signal sampling apparatus is configured of a wavelength filter for selectively emitting the optical signal having a wavelength component of the optical signal to be monitored, of the optical signals emitted from the other terminal of the two optical terminals of the electroabsorption modulator.

9. The optical signal monitor apparatus according to claim 7, wherein the optical combiner of the optical signal sampling apparatus is configured to combine the optical signal to be monitored and the sampling light pulse with each other using polarized waves orthogonal to each other, and the optical separator of the optical signal sampling apparatus is configured of a polarization filter for selectively emitting the optical signal having a polarization component of the optical signal to be monitored, of the optical signals emitted from the other terminal of the two optical terminals of the electroabsorption modulator.

10. The optical signal monitor apparatus according to claim 7, wherein the sampling light pulse generating unit of the optical signal sampling apparatus includes:
a reference signal generator configured as a synthesizer which generates a stable signal having a period Ts corresponding to a period of the sampling light pulse;
a multiplier which multiplies the stable signal having the period Ts generated by the reference signal generator by M (M: integer larger than 1), output as a signal multiplied by M;
a light source which emits continuous light;

an optical modulator which emits an optical pulse having a period Ts/M by modulating the continuous light emitted from the light source with the signal multiplied by M output from the multiplier;

an optical gate circuit which converts the optical pulse emitted from the optical modulator into an optical pulse having the period Ts by thinning the optical pulse to 1/M; and a dispersion decreasing fiber which further narrows the pulse width of the optical pulse having the period Ts converted by the optical gate circuit and emits as the sampling light pulse.

11. The optical signal monitor apparatus according to claim 10, wherein the sampling light pulse generating unit of the optical signal sampling apparatus further comprises a parameter setting unit which receives the information on a clock period Tc of a data signal modulating the optical signal to be monitored or a bit rate and a predetermined offset time $\Delta T$ of the data signal, and determines the sampling period Ts of the sampling light pulse by an arithmetic operation of $Ts = N \cdot Tc + \Delta T$ (where the value N is determined by the clock period Tc of the data signal and a frequency variable range of a signal capable of being output by the sampling light pulse generating unit), a determined sampling period Ts being set in the sampling light pulse generating unit.

12. The optical signal monitor apparatus according to claim 7, wherein the sampling light pulse generating unit of the optical signal sampling apparatus is configured of a short pulse generating unit having a function of generating by self-excited oscillation a short pulse having a frequency different by one integer-th from the frequency of the optical signal to be monitored and shifting the short-pulse frequency.

13. The optical signal monitor apparatus according to claim 7, further comprising:

a fundamental wave component signal output unit which outputs a fundamental wave component signal of a frequency equal to a fundamental wave component of an envelope wave of an output signal from the photoelectric converter;

a comparator which compares the fundamental wave component signal from the fundamental wave component signal output unit with a predetermined threshold value; and a data acquisition control unit which starts the acquisition of the waveform information on the output signal from the photoelectric converter from the timing when the fundamental wave component signal exceeds the predetermined threshold value in a comparing operation of the comparator.

14. The optical signal monitor apparatus according to claim 13, further comprising an analog/digital (A/D) converter inserted between the photoelectric converter and the data acquisition control unit for sampling the electric signal from the photoelectric converter by a sampling clock synchronized with the sampling light pulse and converting the electric signal into a digital value, which is output as a data signal to the data acquisition control unit.

15. The optical signal monitor apparatus according to claim 14, wherein the sampling clock is output in synchronism with the sampling light pulse by the sampling light pulse generating unit.

16. The optical signal monitor apparatus according to claim 13, wherein the fundamental wave component signal output unit, configured as a PLL (phase locked loop), includes:

a narrow-band of bandpass filter having the central frequency equal to a clock frequency of the data signal modulating the optical signal to be monitored or the central frequency equal to twice the clock frequency for extracting a sinusoidal wave of the fundamental wave component signal from the electric signal of the photoelectric converter;

a voltage-controlled oscillator which outputs an oscillation output signal having a predetermined oscillation frequency; and a phase comparator which outputs a control signal corresponding to a phase difference between an output signal of the narrow-band of bandpass filter and the output signal of the voltage-controlled oscillator, wherein the oscillation frequency of the voltage-controlled oscillator is controlled by the control signal output from the phase comparator and a phase of the oscillation output signal is synchronized with a phase of the output signal of narrow-band of the bandpass filter thereby to output a synchronized sinusoidal oscillation output signal as the fundamental wave component signal.

17. The optical signal monitor apparatus according to claim 14, further comprising a waveform memory having a plurality of different areas where the data signal output from the A/D converter are written by the data acquisition control unit based on an output signal of the comparator.

18. The optical signal monitor apparatus according to claim 14, wherein the data acquisition control unit repeats, a predetermined number of times, an operation in which the data signal begins to be written in the waveform memory from the timing when the fundamental wave component signal exceeds the threshold value in the comparator, and after completely writing a predetermined number of the data signal, the operation stands by until the timing when the fundamental wave component signal exceeds the threshold value again, the predetermined number of the data signal being written in the plurality of the different areas of the waveform memory in order of address, respectively.

19. The optical signal monitor apparatus according to claim 14, further comprising an arithmetic operation unit which calculates a value indicating the quality of the optical signal to be monitored, based on the data signal written in the waveform memory.

20. The optical signal monitor apparatus according to claim 19, wherein the arithmetic operation unit compares the data signal written in the waveform memory with a predetermined threshold value, and by separating the data signals into a sample value associated with the data "1" and a sample value associated with the data "0", determines average values and standard deviation of sample value groups for each of the data thereby to determine a ratio $\mu/\gamma$ between a difference $\mu$ of the average values and a sum $\gamma$ of the standard deviations as a quality value Q.

21. The optical signal monitor apparatus according to claim 19, wherein the arithmetic operation unit capable of obtaining an eye pattern by superposing, in the order of address, the predetermined number of the data signals as the waveform data of a predetermined number of bits stored in each session in the order of address in the plurality of different areas of the waveform memory.

22. An optical signal sampling method comprising:

a sampling light pulse generating step for generating a sampling light pulse of a predetermined period to sample an optical signal to be sampled; and an optical sampling step for sampling the optical signal to be sampled, with the sampling light pulse from the sampling light pulse generating unit and emitting an optical pulse signal obtained by the sampling, wherein the optical sampling step includes:

a step of preparing an optical combiner for combining the optical signal to be sampled and the sampling light pulse with each other;

a step of preparing an electroabsorption modulator having two optical terminals for inputting/outputting light and a power supply terminal for applying an electric field to an optical path connecting the two optical terminals, the modulator having such a characteristic that an absorption rate of the light propagating through the optical path is changed in accordance with the magnitude of the electric field, one terminal of the two optical terminals receiving the light emitted from the optical combiner;

a step of preparing a DC power supply for applying, to the power supply terminal of the electroabsorption modulator, a predetermined DC voltage for sampling the optical signal to be sampled, with the sampling light pulse in the electroabsorption modulator by increasing the absorption rate in the absence of the sampling light pulse incident to the electroabsorption modulator and decreasing the absorption rate in the presence of the sampling light pulse incident to the electroabsorption modulator, the optical signal obtained by the sampling being emitted from another terminal of the two optical terminals; and a step of preparing an optical separator for selectively emitting the optical signal component to be sampled, of the optical signal emitted from the other terminal of the two optical terminals of the electroabsorption modulator.

23. An optical signal monitor method comprising:

a sampling light pulse generating step for emitting a sampling light pulse having a period different by a predetermined offset time from an integer multiple of a clock period of the data signal modulating the optical signal to be monitored;

an optical sampling step for sampling the optical signal to be monitored, by a sampling light pulse and emitting an optical pulse signal obtained by the sampling; and a photoelectric conversion step for acquiring the waveform information of the optical signal to be monitored, by receiving the optical pulse signal emitted from the optical sampling unit of the optical signal sampling apparatus and converting the optical pulse signal into an electric signal, wherein the optical sampling step includes:

a step of preparing an optical combiner for combining the optical signal to be monitored and the sampling light pulse with each other;

a step of preparing an electroabsorption modulator having two optical terminals for inputting and outputting light and a power supply terminal for applying an electric field to an optical path connecting the two optical terminals, the electroabsorption modulator having such a characteristic that an absorption rate of the light propagating through the optical path changes in accordance with the magnitude of the electric field, one terminal of the two optical terminals receiving the light emitted from the optical combiner;

a step of preparing a DC power supply for applying, to the power supply terminal of the electroabsorption modulator, a predetermined DC voltage for sampling the optical signal to be sampled, with the sampling light pulse in the electroabsorption modulator by increasing the absorption rate in the absence of the sampling light pulse incident to the electroabsorption modulator and decreasing the absorption rate in the presence of the sampling light pulse incident to the electroabsorption modulator, thereby emitting an optical signal obtained by the sampling from another terminal of the two optical terminals; and a step of preparing an optical separator for selectively emitting an optical signal component to be sampled, of the optical signal emitted from the other of the two optical terminals of the electroabsorption modulator.

* * * * *